United States Patent
Ogata et al.

(10) Patent No.: US 9,214,039 B2
(45) Date of Patent: Dec. 15, 2015

(54) METHOD FOR CREATING THREE-DIMENSIONAL SHAPE DATA, APPARATUS FOR CREATING THREE-DIMENSIONAL SHAPE DATA, AND CORRESPONDING COMPUTER-READABLE STORAGE MEDIUM

(75) Inventors: Yoshinori Ogata, Nagoya (JP); Ikujiro Kozen, Okazaki (JP)

(73) Assignees: TOYOTA JIDOSHA KABUSHIKI KAISHA, Toyota-shi (JP); 3DG Design Lab, Okazaki-shi (JP)

( * ) Notice: Subject to any disclaimer, the term of this patent is extended or adjusted under 35 U.S.C. 154(b) by 221 days.

(21) Appl. No.: 13/700,308

(22) PCT Filed: May 25, 2011

(86) PCT No.: PCT/IB2011/001117
§ 371 (c)(1),
(2), (4) Date: Nov. 27, 2012

(87) PCT Pub. No.: WO2011/148250
PCT Pub. Date: Dec. 1, 2011

(65) Prior Publication Data
US 2013/0147800 A1 Jun. 13, 2013

(30) Foreign Application Priority Data

May 27, 2010 (JP) ................................ 2010-121182

(51) Int. Cl.
*G06T 15/08* (2011.01)
*G06T 3/00* (2006.01)
(Continued)

(52) U.S. Cl.
CPC .............. *G06T 15/08* (2013.01); *G06T 17/00* (2013.01); *G06T 3/00* (2013.01); *G06T 7/0067* (2013.01); *G06T 17/10* (2013.01)

(58) Field of Classification Search
None
See application file for complete search history.

(56) References Cited

U.S. PATENT DOCUMENTS

| | | | | |
|---|---|---|---|---|
| 5,793,373 A * | 8/1998 | Sekine et al. | .............. | 345/420 |
| 2008/0246762 A1 * | 10/2008 | Ogata et al. | .............. | 345/420 |
| 2010/0239140 A1 * | 9/2010 | Ruijters et al. | .............. | 382/130 |

FOREIGN PATENT DOCUMENTS

| | | |
|---|---|---|
| JP | 6 149943 | 5/1994 |
| JP | 6 301751 | 10/1994 |

(Continued)

OTHER PUBLICATIONS

International Search Report Issued May 18, 2012 in PCT/IB11/01117 Filed May 25, 2011.

(Continued)

*Primary Examiner* — Mark Zimmerman
*Assistant Examiner* — Yu-Jang Tswei
(74) *Attorney, Agent, or Firm* — Oblon, McClelland, Maier & Neustadt, L.L.P.

(57) ABSTRACT

A three-dimensional shape data creating method associates characteristic points and characteristic axes on an image of a sketch drawn by a designer, or the like, with given points and given axes in a vehicle specs box, and determines the placement position and viewpoint direction of the sketch in a three-dimensional space by selecting combinations (point and point, axis and axis, and point and axis) having the minimum error in correspondence. Then, complex surfaces of given regions depicted in the sketch are created at a time in the three-dimensional space, by forming each cross-section line in a given region depicted in the sketch from a basic line and a fillet joint line, and a fillet joint surface is created between adjacent ones of the created complex surfaces of the given regions so as to join the complex surfaces.

17 Claims, 19 Drawing Sheets

(51) Int. Cl.
*G06T 17/10* (2006.01)
*G06T 7/00* (2006.01)
*G06T 17/00* (2006.01)

(56) References Cited

FOREIGN PATENT DOCUMENTS

| JP | 10 269380 | 10/1998 |
| JP | 2000 76453 | 3/2000 |
| JP | 2004 206262 | 7/2004 |
| JP | 4397372 | 10/2009 |
| KR | 10-2008-0069714 | 7/2008 |

OTHER PUBLICATIONS

Luke Olsen, Faramarz F. Samavati, Mario Costa Sousa, Joaquim A. Jorge; "Sketch-based modeling: A survey", Computers & Graphics, Elsevier, GB, vol. 33, No. 1, Feb. 1, 2009, pp. 85-103.

* cited by examiner

FIG. 22
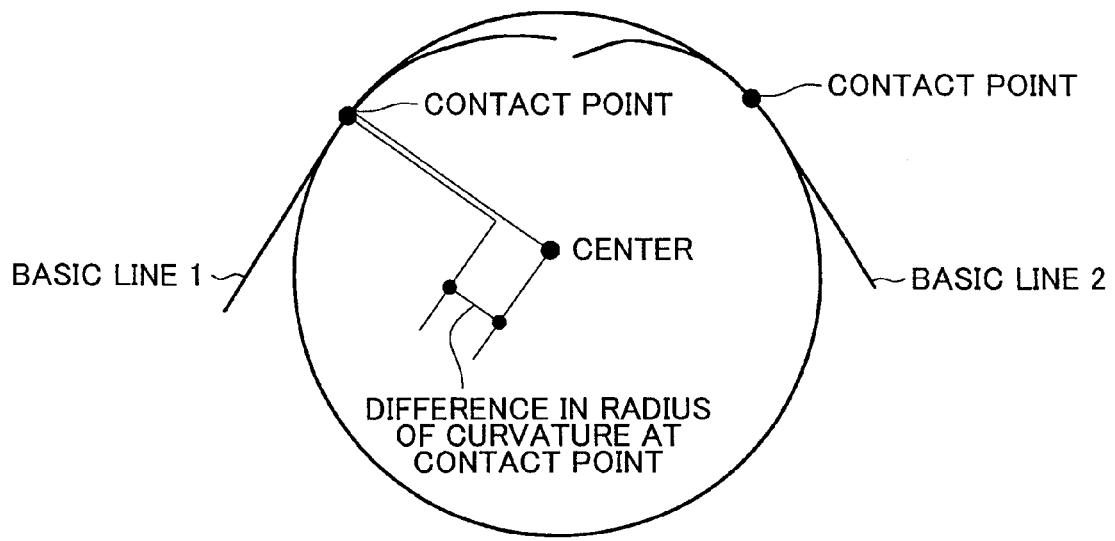
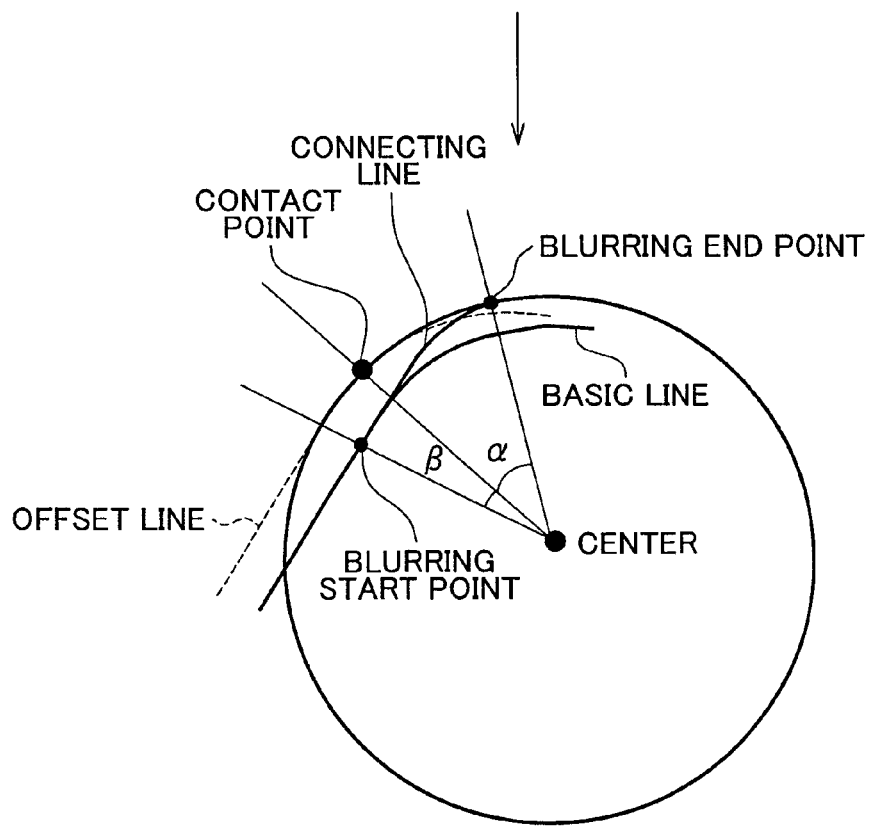

METHOD FOR CREATING THREE-DIMENSIONAL SHAPE DATA, APPARATUS FOR CREATING THREE-DIMENSIONAL SHAPE DATA, AND CORRESPONDING COMPUTER-READABLE STORAGE MEDIUM

BACKGROUND OF THE INVENTION

1. Field of the Invention

The invention relates to a three-dimensional shape data creating method for creating three-dimensional shape data of a three-dimensional object created by a designer, or the like, from a sketch of the three-dimensional object, and also relates to an apparatus for creating three-dimensional shape data and a computer-readable storage medium.

2. Description of Related Art

Various methods for creating three-dimensional shape data of a three-dimensional object created by a designer, or the like, from a sketch of the three-dimensional object, have been proposed, as disclosed in Japanese Patent Application Publication No. 6-149943 (JP-A-6-149943), Japanese Patent Application Publication No. 2004-206262 (JP-A-2004-206262), Japanese Patent Application Publication No. 6-301751 (JP-A-6-301751), and Japanese Patent Application Publication No. 10-269380 (JP-A-10-269380). For example, JP-A-6-149943 discloses a method of creating three-dimensional shape data of a three-dimensional object, using a perspective view (sketch) of the three-dimensional object in which a cross-section line(s) that appears when the object is cut in a given plane is/are depicted, wherein the three-dimensional shape data is created by obtaining a plane equation representing the plane in a three-dimensional space of an orthogonal coordinate system, from a disappearance point corresponding to the above plane relative to the perspective view, and projecting the cross-section line(s) onto the plane represented by the plane equation.

Also, a method of creating three-dimensional data by reading perspective views in the form of two or more hand-written sketches, and processing data obtained from the sketches, is disclosed in, for example, JP-A-2004-206262.

In the related art as described above, even though the sketch drawn by a designer, or the like, is a mathematically inaccurate perspective drawing, three disappearance points are obtained and the viewpoint position and three-dimensional space are defined on the assumption that the perspective drawing is correct or accurate. Then, using the three-dimensional space thus defined, (1) a method of forming a three-dimensional or stereoscopic image by a method like a triangulation method, from two or more sketches having different lines of sight or different views, (2) a method in which a three-dimensional shape analogous to that in a perspective drawing is searched for, and the analogous three-dimensional shape is deformed by a neural network, or the like, so as to create a three-dimensional or stereoscopic image in accordance with the perspective drawing, or (3) a method in which a single plane view is human-created in a CAD (Computer-Aided-Design) way, and is combined with lines of a perspective drawing, for example, is carried out.

However, since the sketch created by a designer, or the like, is not necessarily drawn in accordance with an accurate orthogonal coordinate system, the coordinate system is often greatly distorted by the image possessed by the designer. Therefore, when three-dimensional shape data is generated in the three-dimensional space of the orthogonal coordinate system as in the above-described related art, the three-dimensional shape data may not appropriately reflect the image intended by the designer.

In view of the related art as described above, the inventors of this application has proposed a method for creating three-dimensional shape data, by associating two-dimensional points and axes in a sketch drawn by a designer, etc., with points and axes set in a three-dimensional space, using an angle method, so as to determine the viewpoint position and converting a three-dimensional object in the sketch into three-dimensional form, as disclosed in Japanese Patent No. 4397372 (JP-B-4397372). In this manner, three-dimensional shape data can be generated which appropriately reflects the concept or image possessed by the designer and expressed in the sketch.

Regarding determination of the viewpoint position, Japanese Patent Application Publication No. 2000-76453 (JP-A-2000-76453) discloses a method in which a still image (sketch) drawn by a designer, or the like, is retrieved, and the viewpoint is found or determined based on the positional relationship of straight lines in the retrieved still image (sketch).

In the meantime, in connection with determination of the viewpoint position according to the method as disclosed in JP-B-4397372, a solution obtained by the angle method (and the disclosed three-point method) is not a general solution, but a special solution for which equations need to be individually expanded or developed. Therefore, it is necessary to formulate equations for each sketch drawn by a designer, or the like, and to determine whether an appropriate solution is obtained, and it may be time-consuming to accomplish these tasks.

Also, in the method as disclosed in JP-B-4397372, creation of image lines, generation of cross-section lines, generation of spatial lines, and creation of curved surfaces are sequentially carried out. Therefore, the user needs to select (designate) the same line at many times, for example, and there is room for improvement in the operational efficiency, namely, it is desirable to reduce the complexity in operation.

Furthermore, in the method as disclosed in JP-B-4397372, two-face filleting (rounding) for creation of a curved surface is carried out simply utilizing the known CAD function. In this case, if a fillet portion is formed by arcs, a difference in the curvature appears in the created curved surface, thus making it impossible to create a high-quality curved surface. In order to avoid the appearance of such a difference in the curvature, the user needs to designate a beginning line and an ending line of the fillet portion, and designate a sweep cross-section, resulting in deterioration of the operational efficiency.

SUMMARY OF THE INVENTION

The invention provides a three-dimensional shape data creating method for creating three-dimensional shape data that reflects the intention or image possessed by a designer, or the like, and an apparatus for creating such three-dimensional shape data and a computer-readable storage medium.

A three-dimensional shape data creating method for creating three-dimensional shape data of a three-dimensional object depicted in a sketch image according to a first aspect of the invention includes the steps of: entering specifications of the three-dimensional object depicted in the sketch image, including dimensions of respective portions of the three-dimensional object and placement positions of parts that constitute the three-dimensional object, which are necessary to create a specs box used for defining given axes and given points on the three-dimensional object, in a three-dimensional space, reading the sketch image as image data, generating data representing lines included in the read image data, using coordinate values on a two-dimensional coordinate system, selecting a characteristic axis and a characteristic point which characterize the shape of the three-dimensional object depicted in the sketch image; calculating a combination that satisfies a predetermined restraint condition, which is selected from combinations obtained by associating the selected characteristic axis and the selected characteristic point with the given axis and the given point in the specs box created from the specifications, determining positional relationships in the three-dimensional space, among the three-dimensional object depicted in the sketch image, a viewpoint from which the sketch image is viewed, and the specs box, using the calculated combination, creating a cross-section line in the three-dimensional space by mapping a cross-section line in a given region of the three-dimensional object depicted in the sketch image, in the three-dimensional space, based on the determined positional relationships, creating a specified line in the given region included in the sketch image and formed into data, as a spatial curve in the three-dimensional space, using the cross-section line in the three-dimensional space, and creating a complex surface of the given region in the three-dimensional space, and creating a fillet joint surface between the created complex surface of the given region, and a created complex surface of another given region, and continuously joining the created complex surface of the given region and the created complex surface of the above-indicated another given region.

In the three-dimensional shape data creating method according to the first aspect of the invention, the specified line may be a character line selected from contours of the three-dimensional object.

Also, in the three-dimensional shape data creating method according to the first aspect of the invention, the predetermined restraint condition may be selected from at least one of a restraint condition that sketch point coordinates representing a given point on the sketch image coincide with coordinates of a corresponding point on a three-dimensional coordinate system, a restraint condition that the sketch point coordinates coincide with coordinates obtained from the coordinates of the corresponding point on the three-dimensional coordinate system, a restraint condition that a plane formed by a given axis on the sketch image and the viewpoint and a given axis in the three-dimensional space are parallel with each other, and a restraint condition that, when a two-dimensional screen is imagined, and a given point on the sketch image, which is connected to the viewpoint, is projected onto the screen, while a given axis in the three-dimensional space, which is connected to the viewpoint, is projected onto the screen, a distance between the projected given point and the projected given axis is minimized.

Also, in the three-dimensional shape data creating method according to the first aspect of the invention, the positional relationships in the three-dimensional space, among the three-dimensional object depicted in the sketch image, the viewpoint of the sketch image, and the specs box, which relationships are determined using the combination that satisfies the predetermined restraint condition, may be listed in increasing order of errors, and may be presented to a user.

Also, in the three-dimensional shape data creating method according to the first aspect of the invention, the cross-section line in the given region of the three-dimensional object depicted in the sketch image may be created in the three-dimensional space, a basic line may be generated which excludes an arc portion from the created cross-section line, the generated basic line may be joined to a fillet joint line comprising an arc and a connecting line having varying curvatures, which have a certain geometrical relationship with the basic line, the spatial curve may be created using the joined basic line and fillet joint line, and the complex surface of the given region may be created in the three-dimensional space, using the created spatial curve, the basic line and the fillet joint line.

Also, in the three-dimensional shape data creating method as described above, the shape of the created complex surface may be corrected by remedying distortion of the created spatial curve, and correcting the shape of the created spatial curve based on at least one of the symmetry of the three-dimensional object depicted in the sketch image, and the three-dimensional object depicted in the sketch image as viewed from another viewpoint.

In the three-dimensional shape data creating method according to the first aspect of the invention, the fillet joint surface may be created by using a fillet joint line comprising an arc and a connecting line having varying curvatures, which have a certain geometric relationship with the basic line of the created complex surface in the given region and the basic line of the created complex surface in the above-indicated another given region.

A computer-readable storage medium according to a second aspect of the invention stores computer-executable instructions for performing the three-dimensional shape data creating method according to the first aspect of the invention.

A three-dimensional shape data creating apparatus that creates three-dimensional shape data of a three-dimensional object depicted in a sketch image according to a third aspect of the invention includes input receiving means for receiving specifications of the three-dimensional object drawn by a user in the sketch image, including dimensions of respective portions of the three-dimensional object and placement positions of parts that constitute the three-dimensional object, which are necessary to create a specs box used for defining given axes and given points on the three-dimensional object, in a three-dimensional space, reading means for reading the sketch image as image data, data generating means for generating data representing lines included in the read image data, using coordinate values on a two-dimensional coordinate system, selecting means for selecting a characteristic axis and a characteristic point which characterize the shape of the three-dimensional object depicted in the sketch image, determining means for calculating a combination that satisfies a predetermined restraint condition, which is selected from combinations obtained by associating the selected characteristic axis and the selected characteristic point with the given axis and the given point in the specs box created from the input specifications, and determining positional relationships in the three-dimensional space, among the three-dimensional object depicted in the sketch image, a viewpoint from which the sketch image is viewed, and the specs box, using the calculated combination, creating means for creating a cross-section line in the three-dimensional space by mapping a cross-section line in a given region of the three-dimensional object depicted in the sketch image, in the three-dimensional space, based on the determined positional relationships, creating a specified line in the given region included in the sketch image and formed into data, as a spatial curve in the three-dimensional space, using the cross-section line in the three-dimensional space, and creating a complex surface of the given region in the three-dimensional space, and surface joining means for creating a fillet joint surface between the created complex surface of the given region, and a created complex surface of another given region, and continuously joining the created complex surface of the given region and the created complex surface of the above-indicated another given region.

Also, in the three-dimensional shape data creating apparatus according to the second aspect of the invention, the specified line may be a character line selected from contours of the three-dimensional object.

Also, in the three-dimensional shape data creating apparatus according to the second aspect of the invention, the predetermined restraint condition may be selected from at least one of a restraint condition that sketch point coordinates representing a given point on the sketch image coincide with coordinates of a corresponding point on a three-dimensional coordinate system, a restraint condition that the sketch point coordinates coincide with coordinates obtained from the coordinates of the corresponding point on the three-dimensional coordinate system, a restraint condition that a plane formed by a given axis on the sketch image and the viewpoint and a given axis in the three-dimensional space are parallel with each other, and a restraint condition that, when a two-dimensional screen is imagined, and a given point on the sketch image, which is connected to the viewpoint, is projected onto the screen, while a given axis in the three-dimensional space, which is connected to the viewpoint, is projected onto the screen, a distance between the projected given point and the projected given axis is minimized.

Also, in the three-dimensional shape data creating apparatus according to the second aspect of the invention, the determining means may include presenting means for listing, in increasing order of errors, the positional relationships in the three-dimensional space, among the three-dimensional object depicted in the sketch image, the viewpoint of the sketch image, and the specs box, which relationships are determined using the combination that satisfies the predetermined restraint condition, and presenting the positional relationships to the user.

In the three-dimensional shape data creating apparatus according to the second aspect of the invention, the creating means may include cross-section creating means for creating the cross-section line in the given region of the three-dimensional object depicted in the sketch image, in the three-dimensional space, base line generating means for generating a basic line that excludes an arc portion from the created cross-section line, basic line joining means for joining the generated basic line to a fillet joint line comprising an arc and a connecting line having varying curvatures, which have a certain geometrical relationship with the basic line, spatial curve creating means for creating the spatial curve using the joined basic line and fillet joint line, and complex surface creating means for creating the complex surface of the given region in the three-dimensional space, using the created spatial curve, the basic line and the fillet joint line.

In the three-dimensional shape data creating apparatus as described above, the creating means may include shape correcting means for correcting the shape of the complex surface created by the complex surface creating means, by remedying distortion of the created spatial curve created by the spatial curve creating means, and correcting the shape of the created spatial curve based on at least one of the symmetry of the three-dimensional object depicted in the sketch image, and the three-dimensional object depicted in the sketch image as viewed from another viewpoint.

Also, in the three-dimensional shape data creating apparatus according to the second aspect of the invention, the surface joining means may include joint surface creating means for creating the fillet joint surface, using a fillet joint line comprising an arc and a connecting line having varying curvatures, which have a certain geometric relationship with the basic line of the complex surface in the given region created by the creating means and the basic line of the created complex surface in the above-indicated another given region.

According to the three-dimensional shape data creating method of the first aspect of the invention, the computer-readable storage medium of the second aspect of the invention and the three-dimensional shape data creating apparatus of the third aspect of the invention, when the viewpoint position is determined, a general solution for associating characteristic points and characteristic axes on the three-dimensional object depicted in the sketch with given points and given axes in the specs box, namely, a general solution for associating points with points, axes with axes, and points and axes, can be obtained; therefore, the optimum viewpoint position (in other words, the positional relationship in the three-dimensional space among the three-dimensional object depicted in the sketch image, the viewpoint of the sketch image, and the specs box) can be extremely promptly determined with reliability. Also, a cross-section line in a given region of the three-dimensional object depicted in the sketch image is determined based on the determined viewpoint position (positional relationship), so that complex surfaces of given regions can be generated at a time, and the complex surfaces of adjacent ones of the given regions can be continuously and smoothly joined. Accordingly, it is possible to create three-dimensional shape data including highly aesthetic, extremely high-quality curved surfaces, through simplified operations performed with extremely high efficiency.

Since the three-dimensional object (two-dimensional) drawn in the sketch by the user, such as a designer, is appropriately reflected by the three-dimensional shape data, it is possible to create three-dimensional shape data exactly as intended or imaged by the user, such as a designer, in the sketch. Accordingly, a three-dimensional product can be quickly fabricated, using the created three-dimensional shape data as it is, as working or machining data, for example, whereby the product development process can be significantly shortened.

Furthermore, the two-dimensional image depicted in the sketch can be extremely easily and accurately converted into three-dimensional form. Therefore, the three-dimensional or stereoscopic image of the sketch may be naturally combined with a photographic background image, or two-dimensional animated characters may be easily converted into three-dimensional form.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 22 is a schematic view useful for explaining a design filleting process of an external contact pattern in the three-dimensional shape data creating method as one embodiment of the invention;

DETAILED DESCRIPTION OF EMBODIMENTS

One embodiment of the invention will be described in detail with reference to the drawings. While the following description is concerned with a sketch of a vehicle, the method for creating three-dimensional shape data according to this invention may also be applied to sketches of various non-vehicular three-dimensional objects, such as electrical appliances, railroad equipment, and airplanes. In the following description, "two-dimensional" and "three-dimensional" may be abbreviated as "2D" and "3D", respectively, when appropriate.

Initially, the operation performed according to a method for creating three-dimensional shape data as one embodiment of the invention will be generally described. The following description of the three-dimensional shape data creating method as one embodiment of the invention will also serve as the description of an apparatus for creating three-dimensional shape data as one embodiment of the invention.

The method for creating three-dimensional shape data as one embodiment of the invention comprises (1) a step of reading an image of a sketch by means of a scanner, and causing a computer to read image data of the sketch so as to form data representing the sketch image, (2) a step of associating characteristic points and characteristic axes that characterize a three-dimensional object depicted on the sketch, with certain points and certain axes in a three-dimensional space defined in the computer, namely, associating points with points, axes with axes, and points with axes, respectively, so as to define the placement position and observation position (viewpoint) in the three-dimensional space of the sketch, (3) a step of mapping cross-section lines (such as the center, doors, etc. of the vehicle), out of lines (which will also be called "image lines") depicted in the sketch, in the three-dimensional space, and creating complex surfaces in the three-dimensional space at a time, which surfaces represent given regions of the three-dimensional object depicted in the sketch, and (4) a step of joining the complex surfaces of the given regions with joint surfaces.

The CPU of the computer cooperates with a program stored in a memory to implement each of the above-indicated steps of the three-dimensional shape data creating method as one embodiment of the invention. Thus, the case where the computer is used for carrying out the three-dimensional shape data creating method of this embodiment will be hereinafter illustrated. The program for creating three-dimensional shape data according to this invention may be stored in DVD-ROM, DVD-R, DVD-RW, DVD-RAM, CD-ROM, CD-R, CD-RW, or any other type of medium.

Figure 1:
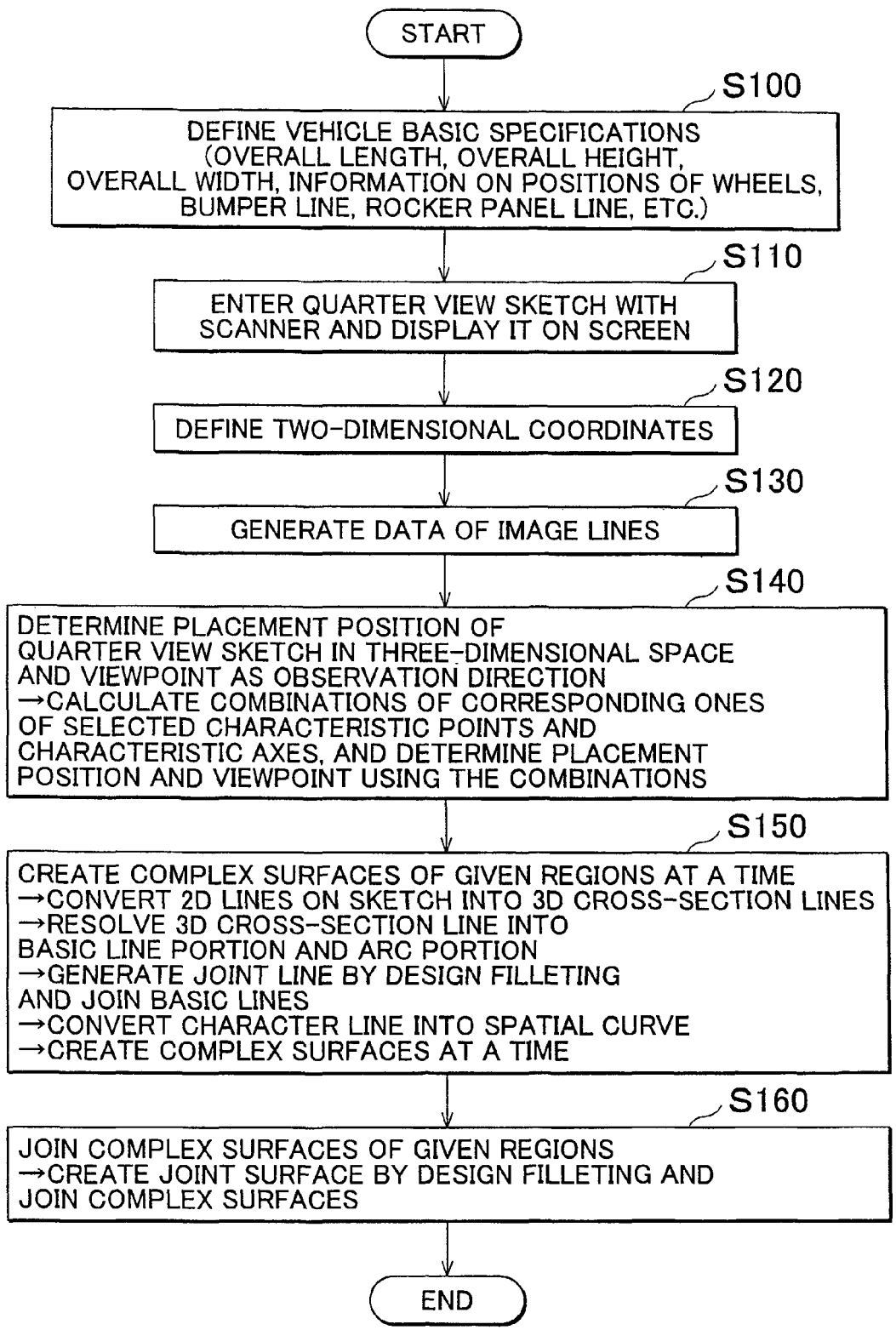
FIG. 1 is a flowchart illustrating steps of a three-dimensional shape data creating method as one embodiment of the invention.

FIG. 1 is a flowchart illustrating the method for creating three-dimensional shape data from a sketch according to one embodiment of the present invention. In this specification, the term "sketch" shall not mean a precise perspective representation, but refers to a picture or drawing that expresses an intention or image possessed by a designer, or the like, in which the ratios and angles may differ from portion to portion, and the overall configuration may be inaccurate.

Figure 2:
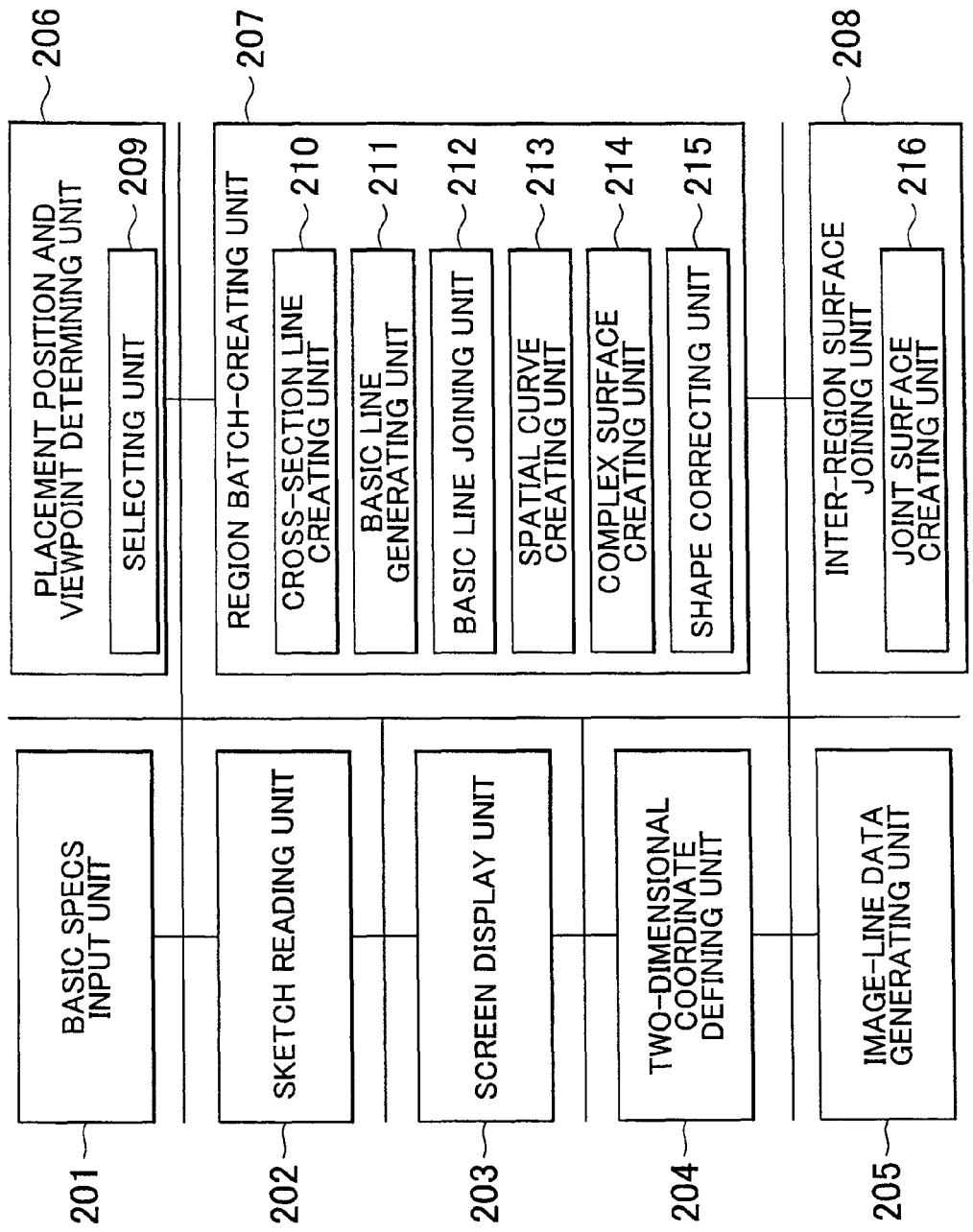
FIG. 2 is a functional block diagram of a computer that implements the three-dimensional shape data creating method as one embodiment of the invention.

FIG. 2 is a functional block diagram showing the functions of the computer when it carries out the three-dimensional shape data creating method as one embodiment of the invention. As shown in FIG. 2, the computer, which is adapted to carry out the three-dimensional shape data creating method as one embodiment of the invention, includes a basic specs input unit 201 in the form of a keyboard, or the like, for entering specifications, such as the length, of the three-dimensional object depicted in the sketch, a sketch reading unit 202 that reads image data of the sketch, using a scanner, or the like, and a screen display unit 203, such as a display, on which the sketch image read by the scanner is displayed.

Furthermore, the computer includes a two-dimensional coordinate defining unit 204 that defines two-dimensional coordinates in the image displayed on the screen display unit 203, an image-line data generating unit 205 that generates data representing lines of the image read by the scanner, a placement position and viewpoint determining unit 206 that determines a placement position of the image read by the scanner, in a three-dimensional space, and a position of a viewpoint from which the image read by the scanner is viewed, a region batch-creating unit 207 that collectively creates complex surfaces of respective regions corresponding to the image read by the scanner, in the three-dimensional space, and an inter-region surface joining unit 208 that creates fillet surfaces between adjacent ones of the created complex surfaces of the respective regions so as to join the complex surfaces.

The placement position and viewpoint determining unit 206 includes a selecting unit 209 that selects characteristic points and characteristic axes that characterize the three-dimensional object on the image read by the scanner. Also, the region batch-creating unit 207 includes a cross-section line creating unit 210 that creates a door cross-section line (SL cross-section line) and a center cross-section line (SW cross-section line), a basic line generating unit 211 that generates basic lines by dividing the created cross-section line into two or more segments, a basic line joining unit 212 that joins the generated basic line with a fillet joint line that consists of an arc having a certain geometrical relationship with the basic line and a connecting line having varying curvatures, a special curve creating unit 213 that creates a special curve, using the cross-section line consisting of the basic line(s) and the fillet joint line(s), a complex surface creating unit 214 that creates a complex surface from the created special curve, the basic line(s) and the fillet joint line(s), so as to form a region, and a shape correcting unit 215 that corrects the shape of the created complex surface.

The inter-region surface joining unit 208 includes a joint surface creating unit 216 that creates a fillet joint surface, using the fillet joint line that consists of an arc having a certain geometrical relationship with the basic line of the complex surface of the region formed, and a connecting line having varying curvatures. These functions of the respective units shown in FIG. 2 may be implemented by executing the program stored in the memory.

Figure 3:
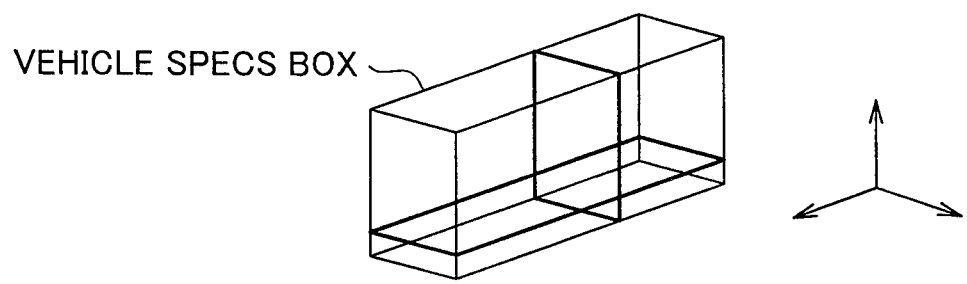
FIG. 3 is a schematic view of a vehicle specs box formed by specification data entered according to the three-dimensional shape data creating method as one embodiment of the invention.

Initially, in FIG. 1, basic specifications of the vehicle are defined (step S100). Here, input data received by the computer includes given specs data (in this embodiment, the overall length, overall width and height of the vehicle, and information on the positions of the vehicle wheels as represented by given points corresponding to characteristic points of the vehicle, and a bumper line and a rocker panel line as represented by given axes corresponding to characteristic axes of the vehicle) of the three-dimensional object. More specifically, data concerning the overall length of the vehicle comprises coordinate data representing the front end point and rear end point of the vehicle as characteristic points of the vehicle, and data concerning the overall width comprises coordinate data representing overall width points that define the maximum width of the vehicle, while data concerning the height comprises coordinate data representing overall height points that define the maximum height of the vehicle, and data concerning information on the wheel positions comprises coordinate data representing the front-wheel center point and rear-wheel center point of the vehicle. The bumper line of the vehicle as a characteristic axis of the vehicle is represented by line data representing a line (axis) that extends in a vehicle-width direction of a bumper provided in a front end portion of the vehicle, for example, and the rocker panel line of the vehicle is represented by line data representing a line (axis) that extends in the vehicle longitudinal direction of a rocker panel portion of the vehicle. With these items of data thus entered, a vehicle specs box that determines the vehicle size and vehicle shape is formed in the three-dimensional space, as shown in FIG. 3.

Figure 4:
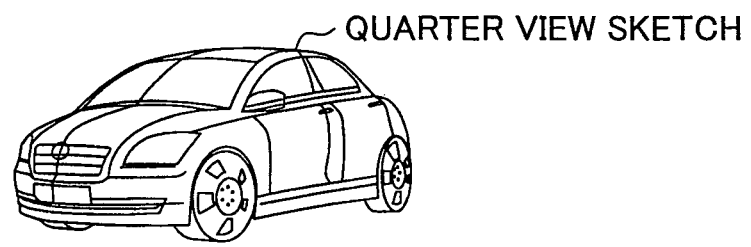
FIG. 4 is a schematic view showing one example of sketch used in the three-dimensional shape data creating method as one embodiment of the invention.

In this embodiment, a vehicle as viewed from a point located ahead of the vehicle in a slanting direction is depicted in the sketch (which will be called "quarter view sketch"), as shown in FIG. 4, and three-dimensional shape data is created based on the quarter view sketch. The quarter view sketch as shown in FIG. 4 is one example of sketch used in the three-dimensional shape data creating method as one embodiment of the invention, and a sketch of an object as viewed in another direction or from another point, or two or more sketches, may also be used.

The image data of the quarter view sketch is read with a scanner, or the like, and is displayed as an image on a display (step S110). Here, the image corresponding to the sketch on the display can be rotated, moved, enlarged, or reduced (scaled down), through the user's operation of a mouse, or the like.

Figure 5:
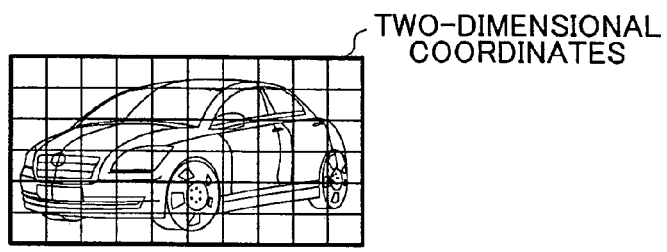
FIG. 5 is a schematic view showing two-dimensional coordinates defined in the image of the sketch in the three-dimensional shape data creating method as one embodiment of the invention.

Then, two-dimensional coordinates are defined in the image data of the sketch entered by means of the scanner (step S120). Namely, the computer defines two-dimensional orthogonal coordinates, based on certain parameters entered by the user, with respect to the sketch image read with the scanner and entered as data, as shown in FIG. 5.

Then, lines (image lines) of the sketch image entered with the scanner are converted into data (step S130). More specifically, each image line of the sketch is expressed as a set of coordinate values on the two-dimensional orthogonal coordinate system. In other words, data in the form of a set of coordinate values defines each image line. The image lines include character lines, such as cross-section lines and contour lines. The conversion of the image lines of the sketch into data can be implemented using the curve creating function normally provided in conventional CAD systems.

Then, a process of determining the placement position of the sketch image read with the scanner in the three-dimensional space and the viewpoint that provides the direction in which the image is observed is carried out (step S140). The determining process is to determine the placement position of the sketch image in the three-dimensional space and the viewpoint that provides the observation direction of the image, by associating characteristic points and characteristic axes on the sketch image, with certain points (characteristic points) and certain axes (characteristic axes) in the three-dimensional space entered in the above-indicated step S100. This determining process will be described in detail.

Figure 6:
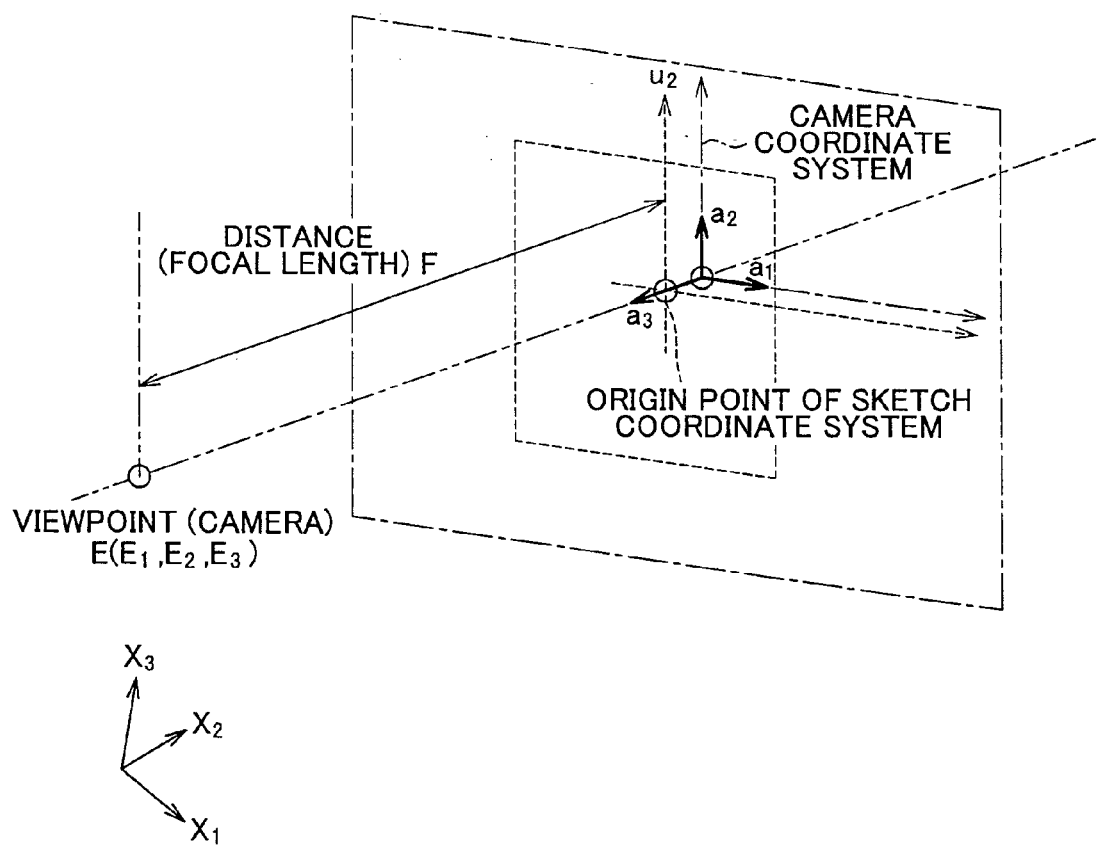
FIG. 6 is a schematic view showing three-dimensional coordinate systems used in the three-dimensional shape data creating method as one embodiment of the invention.

In FIG. 6, $X_1$, $X_2$, $X_3$ denote three axes of a global coordinate system (hereinafter referred to as "3D coordinate system"), and ($E_1$, $E_2$, $E_3$) denote coordinates of the viewpoint (camera) E in the 3D coordinate system, while a coordinate system having axis $a_1$ that extends rightward from the viewpoint (camera), axis $a_2$ that extends upward, and axis $a_3$ that is an outer vector product of $a_1$ and $a_2$ is defined as a camera coordinate system. Also, a $u_1$-$u_2$ coordinate system in the quarter view sketch is defined as a sketch coordinate system, and F denotes the distance (focal length) from the viewpoint (camera) to the sketch.

If the coordinate systems and the distance F are defined as described above, a given point U ($u_1$, $u_2$) on the sketch is represented by the following equation (1), using 3D coordinate values on the 3D coordinate system.

$$\begin{pmatrix} u_1 \\ u_2 \end{pmatrix} = F \frac{\sum_j \begin{pmatrix} a_{1j} \\ a_{2j} \end{pmatrix}(X_j - E_j)}{\sum_j a_{3j}(X_j - E_j)} \quad (1)$$

If the camera coordinate system $a_1$, $a_2$, $a_3$ is expressed using Euler angles $\theta$, $\phi$, $\psi$, seven equations are needed for seven unknowns in the above equation (1), so as to uniquely solve (determine) the viewpoint. The seven unknowns are the coordinates ($E_1$, $E_2$, $E_3$) that represent the position of the viewpoint (camera), Euler angles $\theta$, $\phi$, $\psi$ that represent the camera coordinate system, and the distance F from the viewpoint (camera) to the sketch.

In the three-dimensional shape data creating method as one embodiment of the invention, the seven unknowns are determined so that a value of a function $G_1$ as represented by the following equation (2) is minimized, in other words, the seven unknowns are determined as a minimum value problem involving seven unknowns.

$$G_1(\theta, \phi, \psi, E_1, E_2, E_3, F) = \sum^n w_{pp\_n} f_{pp\_n} + \sum^n w_{aa\_n} f_{aa\_n} + \sum^n w_{ap\_n} f_{ap\_n} \quad (2)$$

Here, $f_{pp\_n}$ on the right-hand side of the above equation (2) represents an error concerning a point matching condition, i.e., correspondence between a given point on the two-dimensional image of the sketch and a given point in the three-dimensional space, as will be described later. Also, $f_{aa\_n}$ on the right-hand side of the above equation (2) represents an error concerning an axis matching condition, i.e., correspondence between a given axis on the two-dimensional image of the sketch and a given axis in the three-dimensional space, as will be described later. Also, $f_{ap\_n}$ on the right-hand side of the above equation (2) represents an error concerning a point-axis matching condition, i.e., correspondence between a given point on the two-dimensional image of the sketch and a given axis in the three-dimensional space, as will be described later. Furthermore, $w_{pp\_n}$, $w_{aa\_n}$, $w_{ap\_n}$ on the right-hand side of the above equation (2) represent weighting factors associated with the respective errors as mentioned above.

If the weighting factors $w_{pp\_n}$, $w_{aa\_n}$, $w_{ap\_n}$ are concerned with the combinations (items) extracted or selected for calculation of the respective errors, from the combinations $_mC_1$ of given points on the two-dimensional image of the sketch and corresponding given points in the three-dimensional space, given axes on the two-dimensional image of the sketch and corresponding given axes in the three-dimensional space, and given points on the two-dimensional image of the sketch and corresponding given axes in the three-dimensional space, the magnitudes of the weights are respectively determined depending on the importance set in advance. On the other hand, if the weighting factors $w_{pp\_n}$, $w_{aa\_n}$, $w_{ap\_n}$ are concerned with the combinations (items) that are not extracted or selected for calculation of the respective errors, from the combinations $_mC_1$, the weighting factors $w_{pp\_n}$, $w_{aa\_n}$, $w_{ap\_n}$ are respectively set to "0".

Next, the error $f_{pp\_n}$ concerning the point matching condition, error $f_{aa\_n}$ concerning the axis matching condition, and the error $f_{ap\_n}$ concerning the point-axis matching condition in the above-indicated equation (2) will be described in detail.

Figure 7:
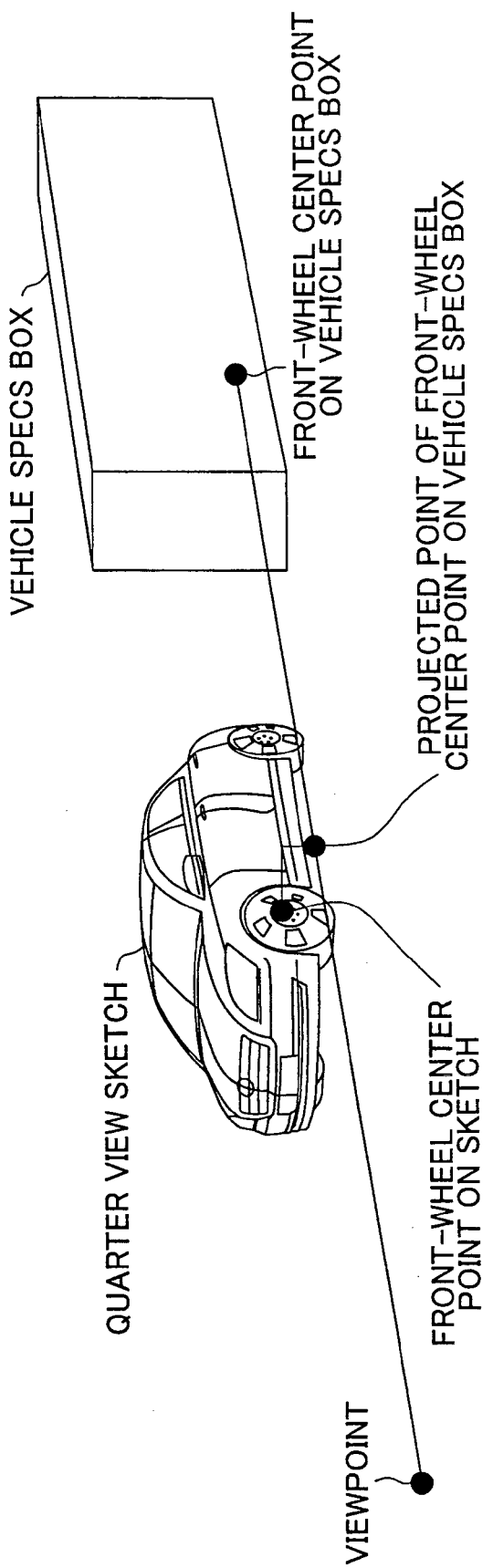
FIG. 7 is a view useful for explaining a point matching condition in the three-dimensional shape data creating method as one embodiment of the invention.

Initially, the error $f_{pp\_n}$ concerning the point matching condition will be explained. The error $f_{pp\_n}$ concerning the point matching condition represents an error that occurs when a given point on the two-dimensional image of the sketch is associated with a given point in the three-dimensional space. Therefore, for calculation of the error $f_{pp\_n}$ concerning the point matching condition, a certain viewpoint and a given point in the three-dimensional space are connected to each other, and the given point is projected on the two-dimensional image of the sketch, as shown in FIG. 7. Then, the viewpoint is adjusted so that an error $f_{pp\_n}$, namely, an error in coordinates between the given point thus projected (projected point) and a given point that lies on the two-dimensional image and corresponds to the projected point, is minimized, whereby the optimum viewpoint can be determined.

In this case, two restraint conditions as follows need to be satisfied when the viewpoint is adjusted so as to minimize the error $f_{pp\_n}$. Namely, a restraint condition that sketch point coordinates representing the given point on the two-dimensional image of the sketch coincide with point coordinates (which will be called "3D point coordinates) on the 3D coordinate system, and a restraint condition that the sketch point coordinates coincide with coordinates obtained from the 3D point coordinates (in other words, the distance between a point represented by the sketch point coordinates and a point represented by the coordinates obtained from the 3D point coordinates is equal to "0") need to be satisfied. These conditions will be specifically described.

Where the camera coordinate system is represented by ($a_1$, $a_2$, $a_3$), E denotes the coordinates of the viewpoint, F denotes the focal length or distance, ($u_1$, $u_2$) denote sketch point coordinates on the two-dimensional coordinates system, ($U_1$, $U_2$) denotes the amount of movement of the view-center origin point, and X denotes 3D point coordinates, the sketch point coordinates are expressed by 3D coordinate values on the 3D coordinate system, based on the above equation (1), so that the restraint condition that the sketch point coordinates coincide with the 3D point coordinates can be satisfied.

$$\begin{pmatrix} u_1 - U_1 \\ u_2 - U_2 \end{pmatrix} = \begin{pmatrix} F \frac{a_1 \cdot (X - E)}{a_3 \cdot (X - E)} \\ F \frac{a_2 \cdot (X - E)}{a_3 \cdot (X - E)} \end{pmatrix} \quad (3)$$

From the restraint condition that the distance between the point represented by the sketch point coordinates and the point represented by the coordinates obtained from the 3D point coordinates is equal to "0", the error $f_{pp\_n}$ concerning the point matching condition is represented by the following equation (4).

$$f_{pp\_n} = \left\{(u_1 - U_1) - F\frac{a_1 \cdot (X - E)}{a_3 \cdot (X - E)}\right\}^2 + \left\{(u_2 - U_2) - F\frac{a_2 \cdot (X - E)}{a_3 \cdot (X - E)}\right\}^2 \quad (4)$$

Under the point matching condition, the above-indicated equations (3) and (4) are formulae of constraints (restraint conditions).

Figure 8:
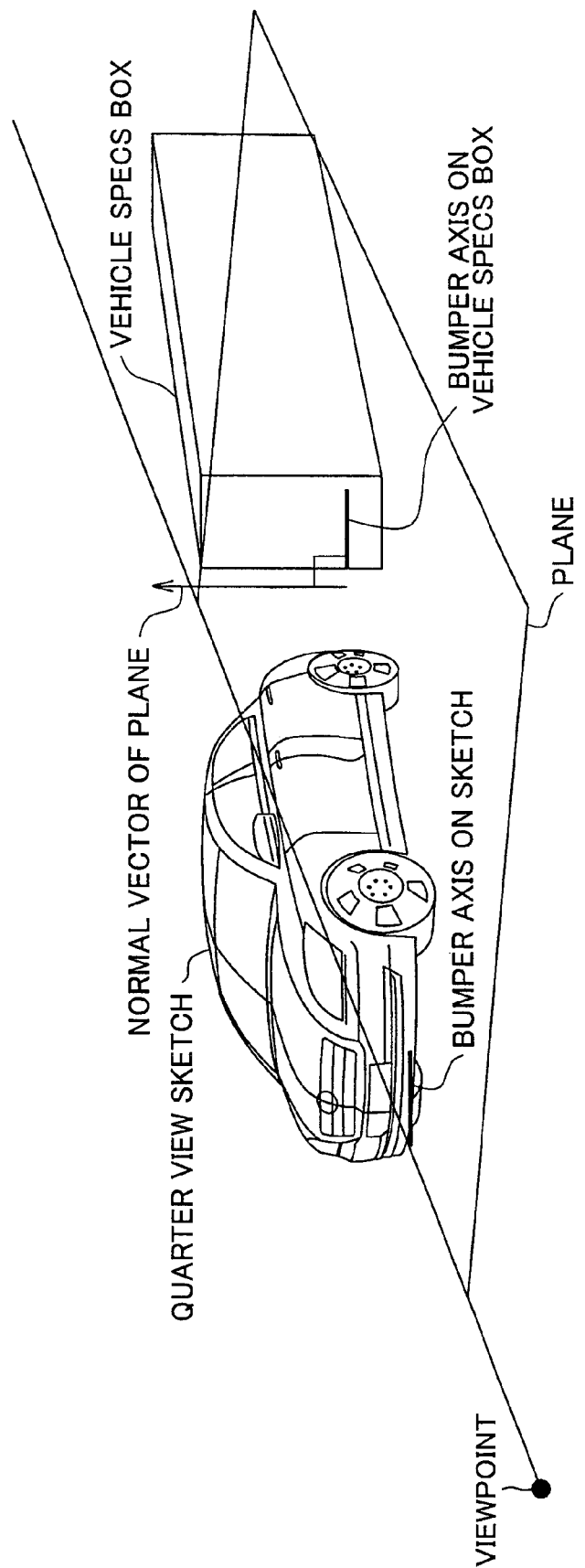
FIG. 8 is a view useful for explaining an axis matching condition in the three-dimensional shape data creating method as one embodiment of the invention.

Next, the error $f_{aa\_n}$ concerning the axis matching condition will be explained. The error $f_{aa\_n}$ concerning the axis matching condition represents an error that occurs when a given axis on the two-dimensional image of the sketch is associated with a given axis in the three-dimensional space. Therefore, for calculation of the error $f_{aa\_n}$ concerning the axis matching condition, a plane formed by a certain viewpoint and the given axis on the two-dimensional image of the sketch is imagined, as shown in FIG. 8. Then, the viewpoint is adjusted so that the vector of the normal to the plane thus formed and the given axis in the three-dimensional space intersect at right angles, whereby the optimum viewpoint can be determined.

In this case, when the viewpoint is adjusted so that the vector of the normal to the plane formed and the given axis in the three-dimensional space intersect at right angles, namely, so that the error $f_{aa\_n}$ is minimized, a restraint condition that the plane formed by the known given axis on the two-dimensional image of the sketch and the viewpoint extends in parallel to the known given axis in the three-dimensional space needs to be satisfied. This condition will be specifically described.

Where $A_n$ denotes the given axis in the three-dimensional space, $(a_1, a_2, a_3)$ denote the axes of the camera coordinate system, v denotes the camera coordinate system, E denotes the coordinates of the viewpoint, F denotes the focal length, the sketch point coordinates on the two-dimensional coordinates system are $(u_1, u_2)$, and the amount of movement of the view-center origin point is represented by $(U_1, U_2)$, the known given axis on the two-dimensional image in the sketch coordinate system is represented by the following equation (5).

$$n_1 u_1 + n_2 u_2 + r = 0 \quad (5)$$

If the known given axis represented by the above equation (5) is projected onto the camera coordinate system v, the following equation (6) is established.

$$n_1 v_1 + n_2 v_2 + (r + n_1 U_1 + n_2 U_2) = 0 \quad (6)$$

Then, the direction $N=\{N_1, N_2, N_3\}$ of the normal to the plane formed by connecting the projected, known given axis represented by the above equation (6) and the viewpoint E is represented by the following equation (7).

$$\begin{pmatrix} N_1 \\ N_2 \\ N_3 \end{pmatrix} = \begin{bmatrix} a_1 & a_2 & \frac{a_3}{F} \end{bmatrix} \begin{pmatrix} n_1 \\ n_2 \\ r + n_1 U_1 + n_2 U_2 \end{pmatrix} \quad (7)$$

To satisfy the restraint condition that the plane represented by the above equation (7) and the known given axis in the three-dimensional space are parallel to each other, the following equation (8) needs to be satisfied.

$$N \cdot A_n = n_1(A_n \cdot a_1) + n_2(A_n \cdot a_2) + \frac{r + n_1 U_1 + n_2 U_2}{F}(A_n \cdot a_3) = 0 \quad (8)$$

Accordingly, the error $f_{aa\_n}$ concerning the axis matching condition is expressed by the following equation (9).

$$f_{aa\_n} = \frac{F}{A_n \cdot a_3}(N \cdot A_n) = n_1\left(F\frac{A_n \cdot a_1}{A_n \cdot a_3}\right) + n_2\left(F\frac{A_n \cdot a_2}{A_n \cdot a_3}\right) + r + n_1 U_1 + n_2 U_2 \quad (9)$$

Under the axis matching condition, the above equation (9) is a formula of constraint (restraint condition).

Figure 9:
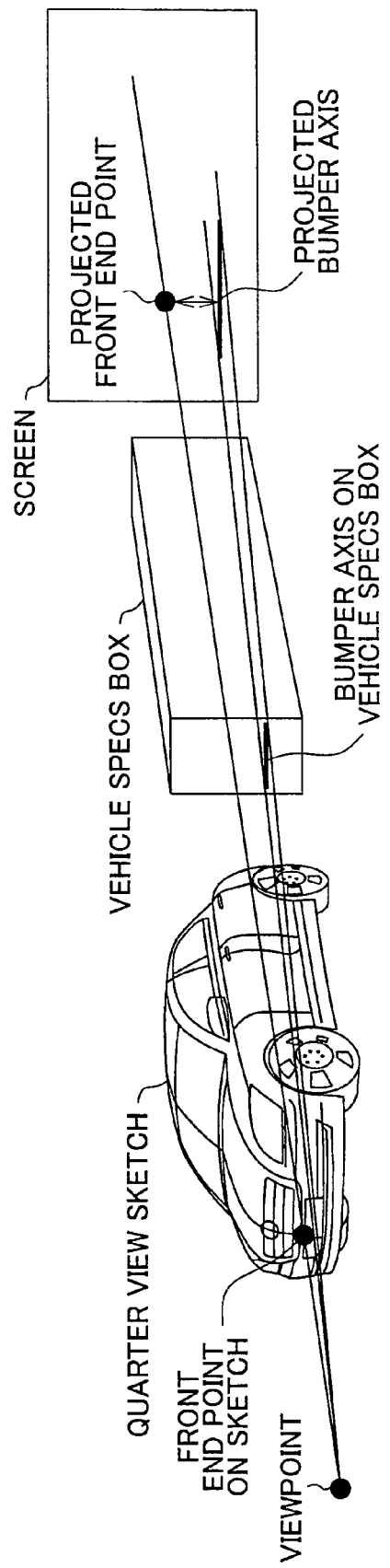
FIG. 9 is a view useful for explaining a point-to-axis matching condition in the three-dimensional shape data creating method as one embodiment of the invention.

Next, the error $f_{ap\_n}$ concerning the point-axis matching condition will be explained. The error $f_{ap\_n}$ concerning the point-axis matching condition represents an error that occurs when a given point on the two-dimensional image of the sketch is associated with a given axis in the three-dimensional space. Therefore, for calculation of the error $f_{ap\_n}$ concerning the point-axis matching condition, a two-dimensional screen is initially imagined, as shown in FIG. 9. Then, a certain viewpoint is connected with a given point on the two-dimensional image of the sketch, and the given point on the two-dimensional image is projected on the imaginary screen. Also, the viewpoint is connected with a given axis (3D axis) in the three-dimensional space, and the given axis in the three-dimensional space is projected on the imaginary screen. Then, the viewpoint is adjusted so as to satisfy a restraint condition that the distance between the given point (projected point) projected on the screen and the projected, given axis (projected line), i.e., the error $f_{ap\_n}$, is minimized, whereby the optimum viewpoint can be determined. This condition will be specifically explained.

Suppose the camera coordinate system is represented by $(a_1, a_2, a_3)$, E denotes the coordinates of the viewpoint, F denotes the focal length, the sketch point coordinates on the two-dimensional coordinates system are $(u_1, u_2)$, the amount of movement of the view-center origin point is represented by $(U_1, U_2)$, X denotes the coordinates of the beginning point of the 3D axis, the screen coordinate system is represented by $(v_1, v_2)$, and $w_1$ and $w_2$ denote predetermined weighting factors. In this case, if the 3D axis is projected on the screen coordinate system, the projected line is represented by the following equation (10).

$$n_1 v_1 + n_2 v_2 + r = 0 \quad (10)$$

Figure 10:
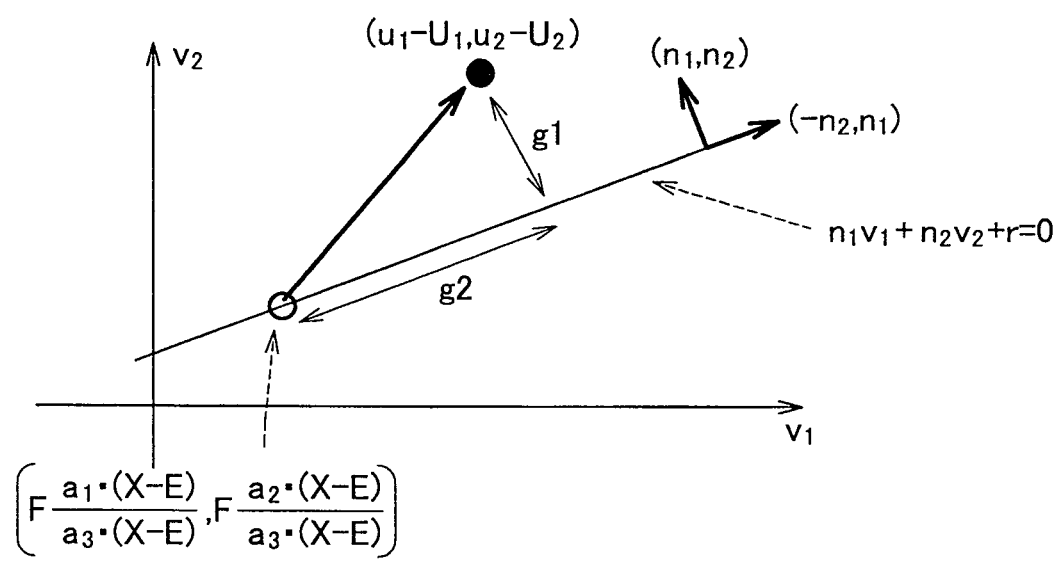
FIG. 10 is a graph indicating the relationship between a projected point and a projected line in a screen coordinate system under the point-to-axis matching condition of FIG. 9.

Here, the projected point and the projected line on the screen coordinate system have a relationship as indicated in FIG. 10. Thus, using a vertical component distance g1 between the projected point and the projected line as represented by the following equation (11), and a distance g2 of a component that extends along the projected line as represented by the following equation (12), the error $f_{ap\_n}$ concerning the point-axis matching condition is represented by the weighted sum of these component distances g1 and g2, as indicated in the following equation (13).

$$g1 = n_1(u_1 - U_1) + n_2(u_2 - U_2) + r \quad (11)$$

$$g2 = n_2\left\{(u_1 - U_1) - F\frac{a_1 \cdot (X - E)}{a_3 \cdot (X - E)}\right\} + (-n_1)\left\{(u_2 - U_2) - F\frac{a_2 \cdot (X - E)}{a_3 \cdot (X - E)}\right\} \quad (12)$$

$$f_{ap\_n} = w_1 \times \{n_1(u_1 - U_1) + n_2(u_2 - U_2) + r\}^2 + w_2 \times \left[n_2\left\{(u_1 - U_1) - F\frac{a_1 \cdot (X - E)}{a_3 \cdot (X - E)}\right\} + (-n_1)\left\{(u_2 - U_2) - F\frac{a_2 \cdot (X - E)}{a_3 \cdot (X - E)}\right\}\right]^2 \quad (13)$$

Under the point-axis matching condition, the above equation (13) is a formula of constraint (restraint condition).

Thus, the above-mentioned seven unknowns are determined as the minimum value problem, by employing the function $G_1$ of the above-indicated equation (2), using the error $f_{pp\_n}$ concerning the point matching condition, error $f_{aa\_n}$ concerning the axis matching condition, and the error $f_{ap\_n}$ concerning the point-axis matching condition as represented by the above equations (4), (9) and (13), respectively, so that the placement position of the quarter view sketch in the three-dimensional space and its viewpoint can be determined with extremely high accuracy. Namely, if the seven unknowns are determined so that the function $G_1$ represented by the above equation (2) is minimized, in other words, so that each error $f_{pp\_n}$, $f_{aa\_n}$ and $f_{ap\_n}$ is reduced or minimized, the placement position of the quarter view sketch in the three-dimensional space can be determined with extremely high accuracy according to the above-indicated equation (1), and the optimum viewpoint can be determined with extremely high accuracy.

Even in the case where a plurality of sets of points and points, axes and axes, and points and axes are associated with each other, the seven unknowns can be determined as the minimum value problem according to the above-indicated equation (2); therefore, the placement position of the quarter view sketch in the three-dimensional space and the optimum viewpoint can be determined with reliability. Namely, since the above-indicated equation (2) can be treated as a general formula, calculations can converge on solution even where a plurality of sets of points and points, axes and axes, and points and axes are associated with each other. As a result, the placement position of the quarter view sketch in the three-dimensional space and the optimum viewpoint can be promptly determined.

With regard to the determining process in step S140 of FIG. 1, an example will be specifically described in which a quarter view sketch of a vehicle drawn by a designer, or the like, is associated with a vehicle specs box, and the placement position of the quarter view sketch in the three-dimensional space and its viewpoint are determined. While the numbers of characteristic points and characteristic axes may be set to any numbers in the three-dimensional shape data creating method as one embodiment of the invention, the case where five points and five axes on the quarter view sketch are associated with the vehicle specs box, for example, will be described.

Figure 11:
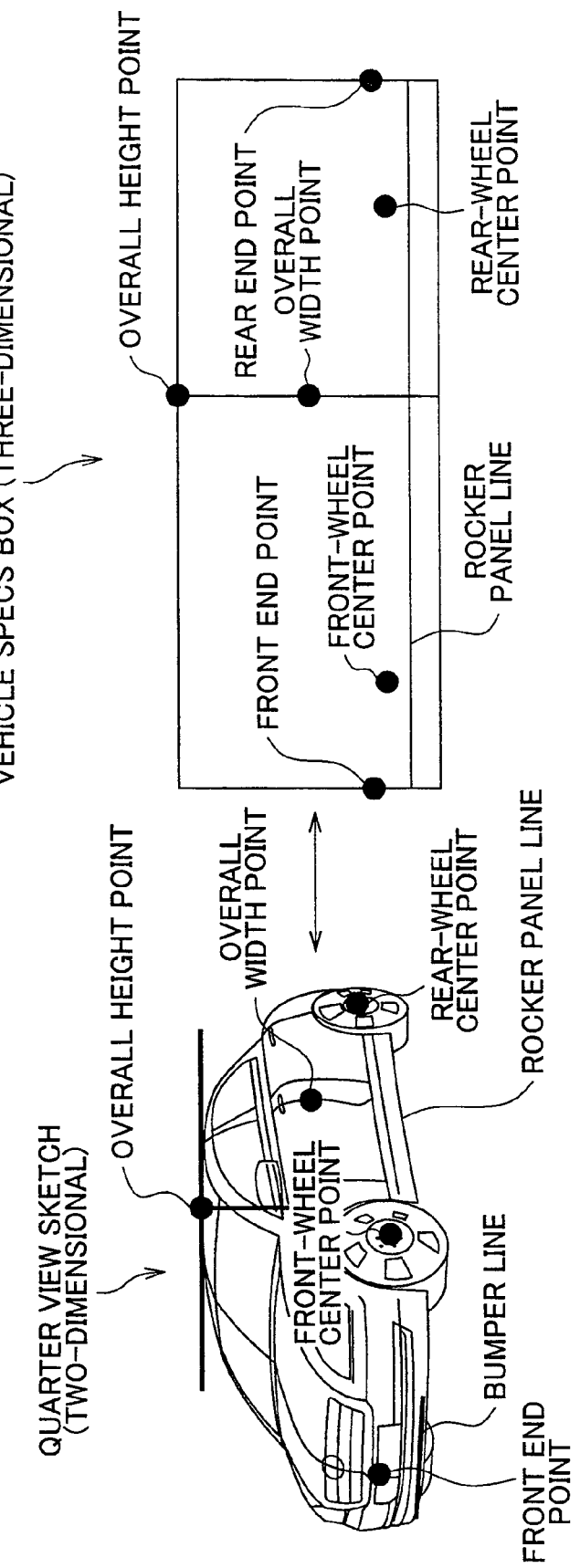
FIG. 11 is a schematic view useful for explaining correspondence between five points and five axis on the sketch image and five points and five axes in the vehicle specs box, in the three-dimensional shape data creating method as one embodiment of the invention.

As described above, in order to set the vehicle specs box, a front end point, rear end point, overall height point, overall width point(s), front-wheel center point, and rear-wheel center point of the vehicle are entered as given points (characteristic points), and a bumper line and a rocker panel line of the vehicle are entered as given axes (characteristic axes) in the above-indicated step S100. In this case, since the vehicle specs box is formed in the three-dimensional space, the longitudinal axis (L axis), vertical axis (H axis) and lateral axis (W axis) of the vehicle are naturally determined. When five points and five axes on the quarter view sketch as viewed from the viewpoint located ahead of the vehicle are associated with respective points and respective axes of the vehicle specs box, the front end point, overall height point, overall width point, front-wheel center point and rear-wheel center point depicted in the quarter view sketch are selected as characteristic points, and the bumper line, rocker panel line, L axis, H axis and W axis are selected as characteristic axes, as shown in FIG. 11 by way of example.

In the selection of these points and axes, the five points and five axes may be automatically selected since the image lines of the sketch are defined by data, as described above, or the five points and five axes may be manually selected through the user's operation of a mouse, or the like.

Then, in order to determine the placement position and optimum viewpoint with high accuracy, four formulae of constraints (restraint conditions) represented by the above equations (3), (4), (9), (13) need to be satisfied. Meanwhile, when five points and five axes on the quarter view sketch are selected, ten (5 points×2) simultaneous equations are obtained since there are two formulae of constraints (the above-indicated equations (3), (4)) for associating the characteristic points on the quarter view sketch with the characteristic points in the vehicle specs box, and five (5 points×1) simultaneous equations are obtained since there is one formula of constraint (the above-indicated equation (9)) for associating the characteristic axes on the quarter view sketch with the characteristic axes in the vehicle specs box. In addition, five (5 points×1) simultaneous equations are obtained since there is one formula of constraint (the above-indicated equation (13)) for associating the characteristic points on the quarter view sketch with the characteristic axes in the vehicle specs box. Namely, when five points and five axes are selected, twenty simultaneous equations are obtained.

Since the above-indicated equation (1) has seven unknowns, as described above, at least seven simultaneous equations are required to be obtained so as to uniquely solve or determine the viewpoint. In the three-dimensional shape data creating method as one embodiment of the invention, the above-mentioned seven unknowns may be determined so that the value of the function $G_1$ represented by the above equation (2) is minimized, in other words, may be determined as the minimum value problem involving seven unknowns. Therefore, the placement position of the quarter view sketch in the three-dimensional space can be determined with higher accuracy, and the optimum viewpoint can be determined with reliability, as compared with the case where the placement position of the quarter view sketch in the three-dimensional space and the viewpoint are determined according to the above-indicated equation (1), merely by determining unknowns using seven simultaneous equations.

Although the accurate placement position and the optimum viewpoint can be obtained by determining seven unknowns so that the value of the function $G_1$ represented by the above equation (2) is minimized, in other words, by solving the minimum value problem involving seven unknowns, as described above, the thus determined placement position and optimum viewpoint do not necessarily reflect the intention or image possessed by the designer, or the like. Namely, the sketch drawn by the designer, or the like, is an inaccurate perspective drawing, and, if it is an accurate perspective drawing, the intention or image possessed by the designer may not be reflected. Therefore, if it is more important to appropriately reflect the intention or image of the designer, it is preferable to allow selection of the placement position and viewpoint that make the error $f_{pp\_n}$ concerning the point matching condition, error $f_{aa\_n}$ concerning the axis matching condition, and the error $f_{ap\_n}$ concerning the point-axis matching condition somewhat larger.

In this case, a function $G_2$ represented by the following equation (14) based on the above-indicated equation (2) is used, and values of the function $G_2$ are listed in increasing order and presented to the user, with respect to seven unknowns determined by all of the combinations $_mC_1$.

$$G_2(\theta, \phi, \psi, E_1, E_2, E_3, F) = \sum^n w_{pp\_n} f_{pp\_n} + \sum^n w_{aa\_n} f_{aa\_n} + \sum^n w_{ap\_n} f_{ap\_n} \quad (14)$$

In the above equation (14), the weighting factors $w_{pp\_n}$, $w_{aa\_n}$, $w_{ap\_n}$, or the magnitudes of the weights, are respectively determined depending on the importance set in advance, even when they are associated with combinations (items) that are not extracted or selected for calculation of the error $f_{pp\_n}$ concerning the point matching condition, the error $f_{aa\_n}$ concerning the axis matching condition, and the error $f_{ap\_n}$ concerning the point-axis matching condition. In this connection, all of the combinations obtained when five points and five axes are selected are $_{20}C_7+_{20}C_8+\ldots+_{20}C_{20}$.

With the list of the values of the function $G_2$ thus displayed on the display and presented to the designer, or the like, he/she can select the placement position and the optimum viewpoint at his/her choice by extremely simply looking at the list order, without having to make trial and error so as to determine the placement position and optimum viewpoint that appropriately reflect the intention or image of the designer.

Once the placement position of the quarter view sketch in the three-dimensional space and the optimum viewpoint are determined in the above manner, complex surfaces of given regions depicted in the quarter view sketch are created at a time, so as to form the given regions (step S150). The process of forming given regions according to the three-dimensional shape data creating method as one embodiment of the invention comprises (1) a step of generating 2D lines that represent each region on the two-dimensional image depicted in the quarter view sketch, more specifically, generating two character lines and a SL cross-section line (center cross-section line) or SW cross-section line (door cross-section line) between the character lines, (2) a step of creating the thus generated two character lines and SL cross-section line (center cross-section line) or SW cross-section line (door cross-section line), in the three-dimensional space, and (3) creating complex surfaces of the respective regions at a time, using the character lines and SL cross-section line (center cross-section line) or SW cross-section line (door cross-section line) created in the three-dimensional space.

Figure 12:
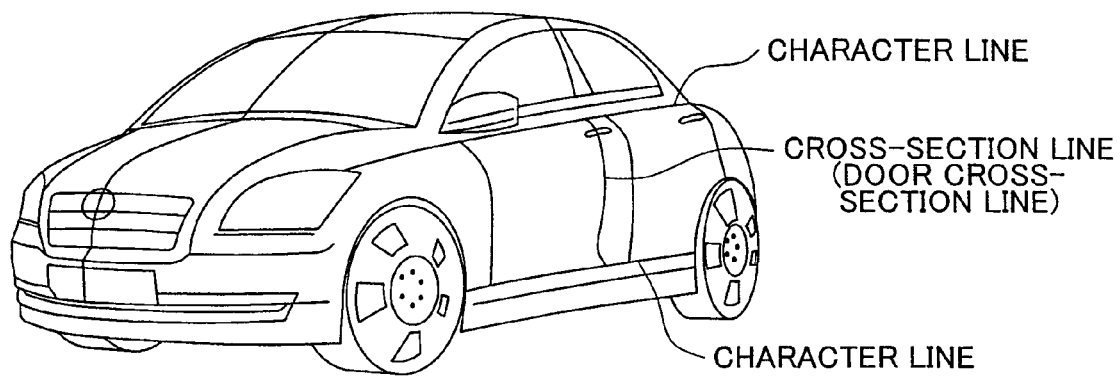
FIG. 12 is a schematic view in which 2D lines are generated according to the three-dimensional shape data creating method as one embodiment of the invention.
Figure 13:
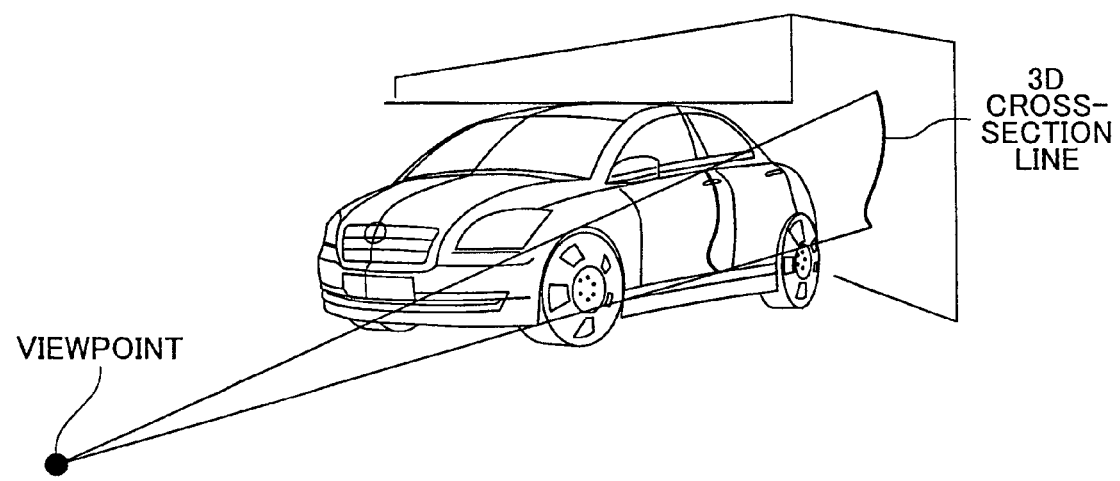
FIG. 13 is a schematic view in which a 3D cross-section line is created according to the three-dimensional shape data creating method as one embodiment of the invention.

In the step of generating the 2D lines, two character lines that represent or define a given region (a door region in FIG. 12) are automatically or manually generated (selected), on the two-dimensional image of the quarter view sketch that has been read and converted into data, and a cross-section line (a door cross-section line in FIG. 12) that intersects with the generated (selected) two character lines and represents the cross-sectional shape of the region is automatically or manually generated (selected). As described above, the placement position of the quarter view sketch is accurately determined and the optimum viewpoint is determined, in the three-dimensional space within the computer. Accordingly, if the 2D door cross-section line is generated (selected) on the two-dimensional image depicted in the quarter view sketch, the cross-section line is projected in the direction as viewed from the viewpoint onto a door cross-section plane in the three-dimensional space, so that a cross-section line in the three-dimensional space, or a 3D cross-section line, is automatically created, as shown in FIG. 13.

The above-mentioned door cross-section plane is a plane containing a contour of the vehicle as viewed in the vehicle longitudinal direction, namely, a plane perpendicular to the vehicle longitudinal direction. While the door cross-section is illustrated as an example in FIG. 12 and FIG. 13, a 3D cross-section line corresponding to the center cross-section line is generated in substantially the same manner. In this case, the 2D center cross-section line is projected in the direction as viewed from the viewpoint onto a center cross-section plane perpendicular to the vehicle lateral direction, and the 3D cross-section line is automatically created in the three-dimensional space.

In the three-dimensional shape data creating method as one embodiment of the invention, once the 3D cross-section lines are created in the above manner, the created 3D cross-section lines are resolved into basic line portions and arc portions (fillet sections), so that the generated (selected) 2D character lines are converted into 3D lines, and high-quality curved surfaces are created at a time. In the following, the process of resolving 3D cross-section lines will be described in detail.

Figure 14:
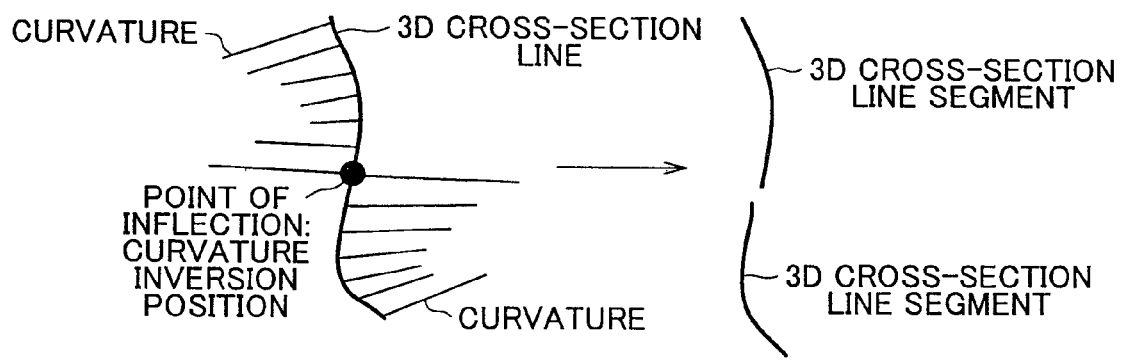
FIG. 14 is a schematic view in which the 3D cross-section line is divided into two segments according to the three-dimensional shape data creating method as one embodiment of the invention.

In the process of resolving 3D cross-section lines, each created 3D cross-section line is automatically resolved into a basic line portion having a monotonous curvature and an arc portion connected to the basic line portion. If a point of inflection, or a curvature inversion position, is present on the created 3D cross-section line, as shown in FIG. 14, the 3D cross-section line is divided at the point of inflection into two segments.

Figure 15:
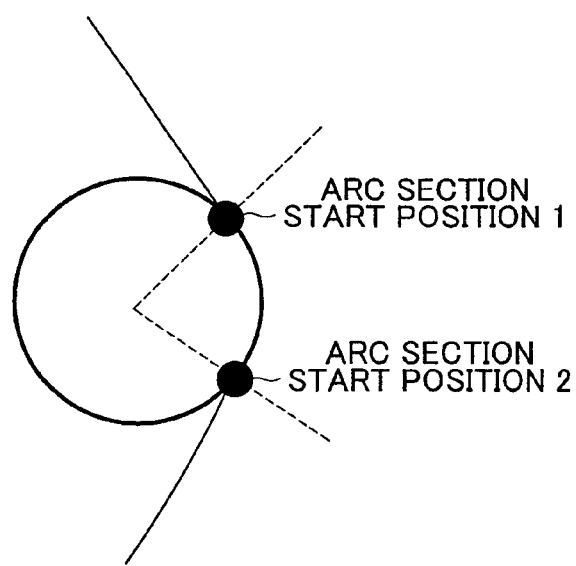
FIG. 15 is a schematic view in which a basic line portion and an arc portion are detected from the 3D cross-section line, in the three-dimensional shape data creating method as one embodiment of the invention.

Then, a basic line portion and an arc portion are detected with respect to each of the 3D cross-section line segments into which the created 3D cross-section line is divided. The arc portion may be detected by using the minimum radius of curvature of the 3D cross-section line segment, or may be detected as an arc section, by obtaining a circle with respect to which errors (or deviations) from points set in a section of the 3D cross-section line segment having any radius of curvature are minimized, as shown in FIG. 15.

With the arc portion (arc section) detected in the above manner, the basic line portion is defined as a portion that exists between an end point of the 3D cross-section line segment and a fillet section that includes the arc portion and joins adjacent basic lines. The basic line portion includes a basic line approximated by a line having a monotonous curvature. In the following description, a quadratic curve will be illustrated as an example of line having a monotonous curvature.

Figure 16:
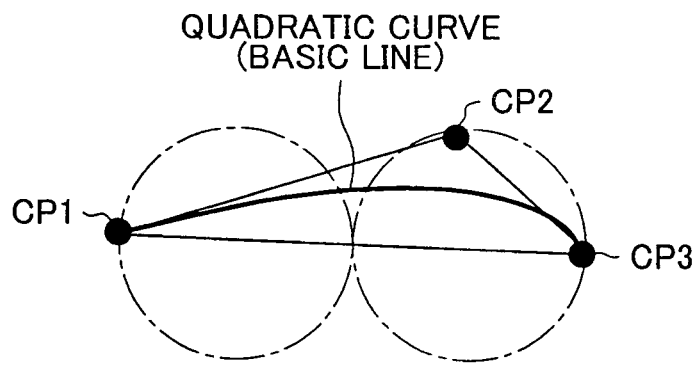
FIG. 16 is a schematic view useful for explaining control points that determine the shape of a quadratic curve approximated to the basic line portion of the 3D cross-section line, in the three-dimensional shape data creating method as one embodiment of the invention.
Figure 17:
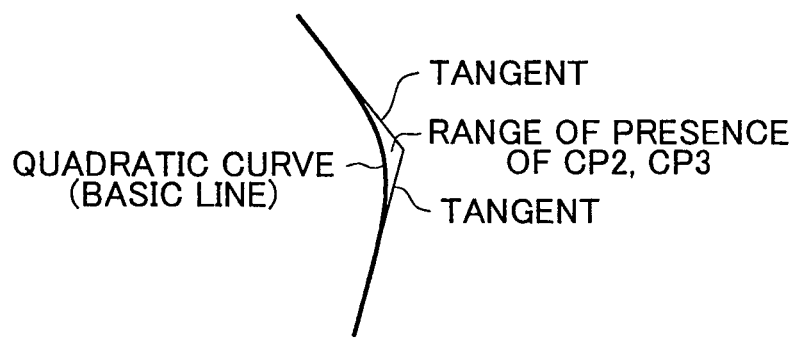
FIG. 17 is a schematic view useful for explaining a range in which the control points that determine the shape of the quadratic curve approximated to the basic line portion of the 3D cross-section line exist or lie, in the three-dimensional shape data creating method as one embodiment of the invention.

The shape of the quadratic curve is determined by three control points CP1, CP2, CP3, as schematically shown in FIG. 16. In this case, the control point CP2 must lie within a range of a circle (which will be called "region circle") whose diameter is provided by a straight line as one half of the chord of the determined quadratic curve, as shown in FIG. 16, and the control points CP2 and CP3 must lie within a region surrounded by tangents having contact points at the opposite ends of the determined quadratic curve, and the quadratic curve, as shown in FIG. 17.

Figure 18:
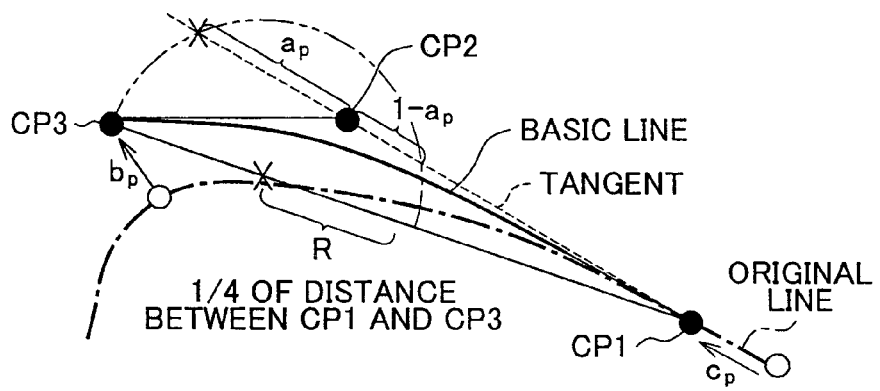
FIG. 18 is a schematic view useful for explaining parameters of the control points that determine the shape of the quadratic curve approximated to the basic line portion of the 3D cross-section, in the three-dimensional shape data creating method as one embodiment of the invention.

These control points CP1, CP2, CP3 are automatically determined by determining three parameters as indicated below; as a result, the quadratic curve, or basic line portion, is determined. More specifically, as shown in FIG. 18, parameter $a_p$ is a parameter for determining the control point CP2, and represents the ratio by which a line between points of intersection of the tangent to the 3D cross-section line segment (which will also be called "original line") and the above-mentioned region circle (semicircle) is internally divided. Parameter $b_p$ is a parameter for determining the control point CP3, and represents the distance from the minimum curvature point on the original line to the point CP as measured in the direction of the normal to the original line. Parameter $c_p$ is a parameter for determining the control point CP1, and represents the distance or chord length from an end point (or the curvature inversion position) of the original line to the effective range of the line.

Figure 19:
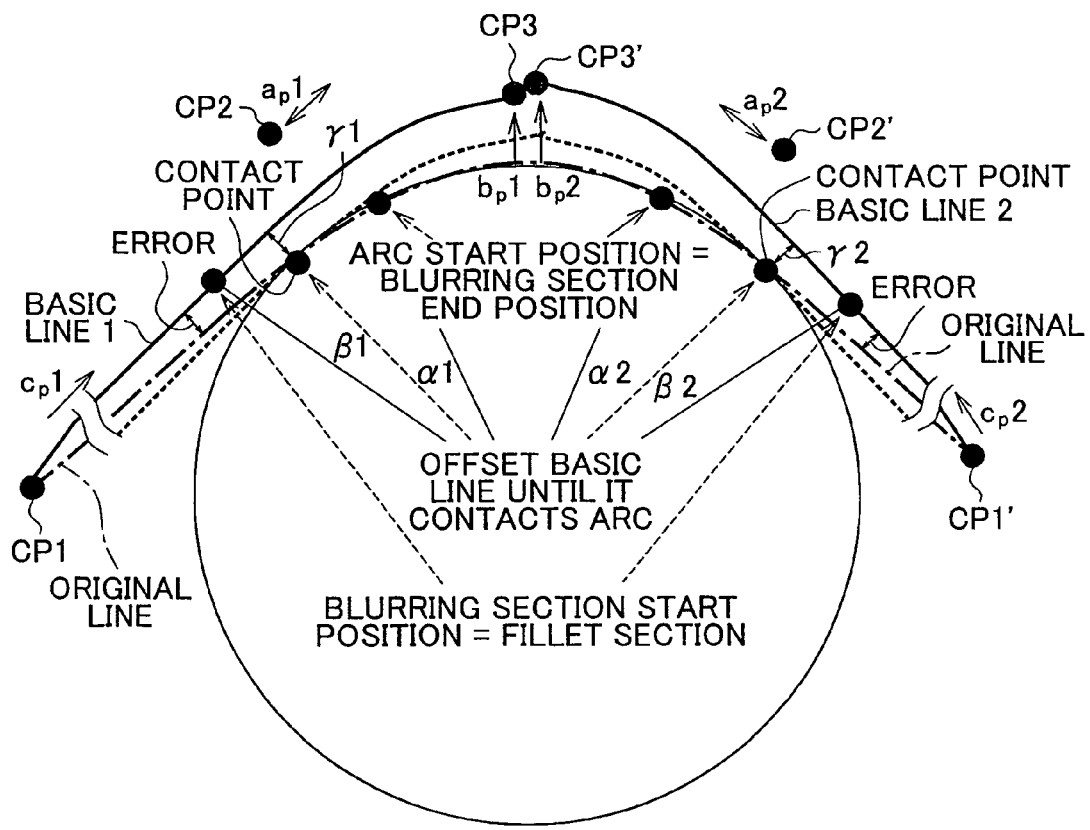
FIG. 19 is a schematic view useful for specifically explaining determination of basic line portions, in the three-dimensional shape data creating method as one embodiment of the invention.

Then, the basic line portion is determined using the quadratic curve determined by the thus determined control points CP1, CP2, CP3. More specifically described with respect to the case where two basic line portions are determined, referring to FIG. 19, parameters ($a_p$, $b_p$, $c_p$) are provisionally determined (for example, are set to the initial values), so that ($a_p1$, $b_p1$, $c_p1$) and ($a_p2$, $b_p2$, $c_p2$) are set. As a result, the control points CP1, CP2, CP3 and the control points CP1', CP2', CP3' as viewed from the opposite ends of the original line are determined, and quadratic curve 1 (corresponding to basic line 1) and quadratic curve 2 (corresponding to basic line 2) can be generated. Then, an osculating circle (arc) having a given radius R is imagined between the quadratic curves, and the quadratic curve 1 and quadratic curve 2 are offset or displaced until they come into contact with this circle (arc). As the imaginary osculating circle (arc), the osculating circle obtained for detecting an arc portion of the original line as described above may be used. Then, similarly to a design filleting process which will be described later, angle α that determines the arc-side blurring start position and angle β that determines the basic-line-side blurring start position, which angles determine a fillet section, and the offset amount γ of the basic line are determined as (α1, β1, γ1) for the quadratic curve 1, and are determined as (α2, β2, γ2) for the quadratic curve 2. In this manner, the original line can be divided into a basic line portion(s), a connecting line portion(s) that will be described later, and an arc portion(s).

Then, the parameters ($a_P1$, $b_P1$, $c_P1$) for determining the control points CP1, CP2, CP3, the parameters ($a_P2$, $b_P2$, $c_P2$) for determining the control points CP1', CP2', CP3', and the radius R of the osculating circle (arc) are determined, so that errors between the original line excluding the fillet section (connecting line portion and arc portions), i.e., the basic line portions, and the quadratic curve 1 and quadratic curve 2 are minimized, whereby two basic lines, i.e., basic line 1 and basic line 2, are finally determined (generated). In this connection, the errors between the original line (basic line portions) and the quadratic curve 1 and quadratic curve 2 may be calculated as the sum of a value obtained by multiplying an error associated with the basic line portion by a given weighting factor e, a value obtained by multiplying an error associated with the connecting line portion by a given weighting factor f, and a value obtained by multiplying an error associated with the arc portion by a given weighting factor g, for example. Then, ($a_P1$, $b_P1$, $c_P1$, $a_P2$, $b_P2$, $c_P2$, R) can be determined by calculating a combination with which the calculated errors are minimized. It is thus possible to generate a smooth basic line(s) that appropriately reflects the shape of a basic line portion(s) of the original line.

Once the two basic lines are created in the manner as described above, these basic lines are joined to each other by a design filleting process, according to the three-dimensional shape data creating method as one embodiment of the invention. In the following, the design filleting process will be described in detail.

A known filleting process is performed for the purpose of chamfering or rounding mechanical components, or the like, for example. Therefore, if three-dimensional shape data including fillets is created from a sketch drawn by a designer, or the like, and shading processing is performed on the shape data, for example, fillet portions may be unnaturally reproduced, and may not reflect the intention or image possessed by the designer. More specifically, if lines are joined simply by arcs, a difference in the curvature may appear in a connecting portion of the arcs, and reflection lines (highlight lines) of a fluorescent lamp, for example, may bend. If lines are joined by a free-form curve formed under a condition of continuity by selecting beginning points of arcs on the lines, an arc portion or portions intended by the designer, or the like, may not be obtained. If the lines are joined so as to achieve curvature continuity (so-called G2 continuity) as a general condition of continuity, the highlight lines may bend or go off depending on the direction of the viewpoint. Thus, the filleting process as described above does not place great importance on the aesthetic appearance needed when evaluating the design or styling.

Thus, in the design filleting process according to the three-dimensional shape data creating method as one embodiment of the invention, a filleting technique implemented when a designer, or the like, draws a sketch through hand writing (namely, a technique of creating a smooth design fillet by drawing a plurality of approach lines that continuously vary in the curvature, over a region from a basic line to a circle (arc)) is converted into an algorithm, which is used for joining two basic lines. Here, the deign filleting process has an internal contact pattern in which a circle (or arc) internally contacts two basic lines, and an external contact pattern in which a circle (or arc) circumscribes two basic lines.

In the internal contact pattern, a certain inscribed circle (arc) that internally contacts two basic lines, i.e., basic line 1 and basic line 2, determined (generated) as described above, is set as shown in FIG. 20. Since the design filleting process is similarly performed on the basic line 1 and the basic line 2, the design filleting process performed on the basic line 1 will be explained in the following description. With the inscribed circle thus set, a difference between the radius of curvature of the basic line 1 at a point of contact and the radius of curvature of the inscribed circle (which will be referred to as "difference in the radius of curvature") is calculated.

Then, the basic line 1 is offset inward in the direction of the radius of curvature, by an offset amount γ determined as described later, based on the calculated difference in the radius of curvature. Then, a certain inscribed circle (arc) is set again, with respect to the basic line 1 (and the basic line 2) that has been offset. Subsequently, a straight line connecting the center of the set inscribed circle (arc) and the point of contact is set, and opening angles α and β are determined as described later, with reference to the straight line. Then, a point on the inscribed circle (arc), which corresponds to the opening angle α, is set as a blurring end point, and a point on the basic line 1, which corresponds to the opening angle β, is set as a blurring start point.

Figure 21:
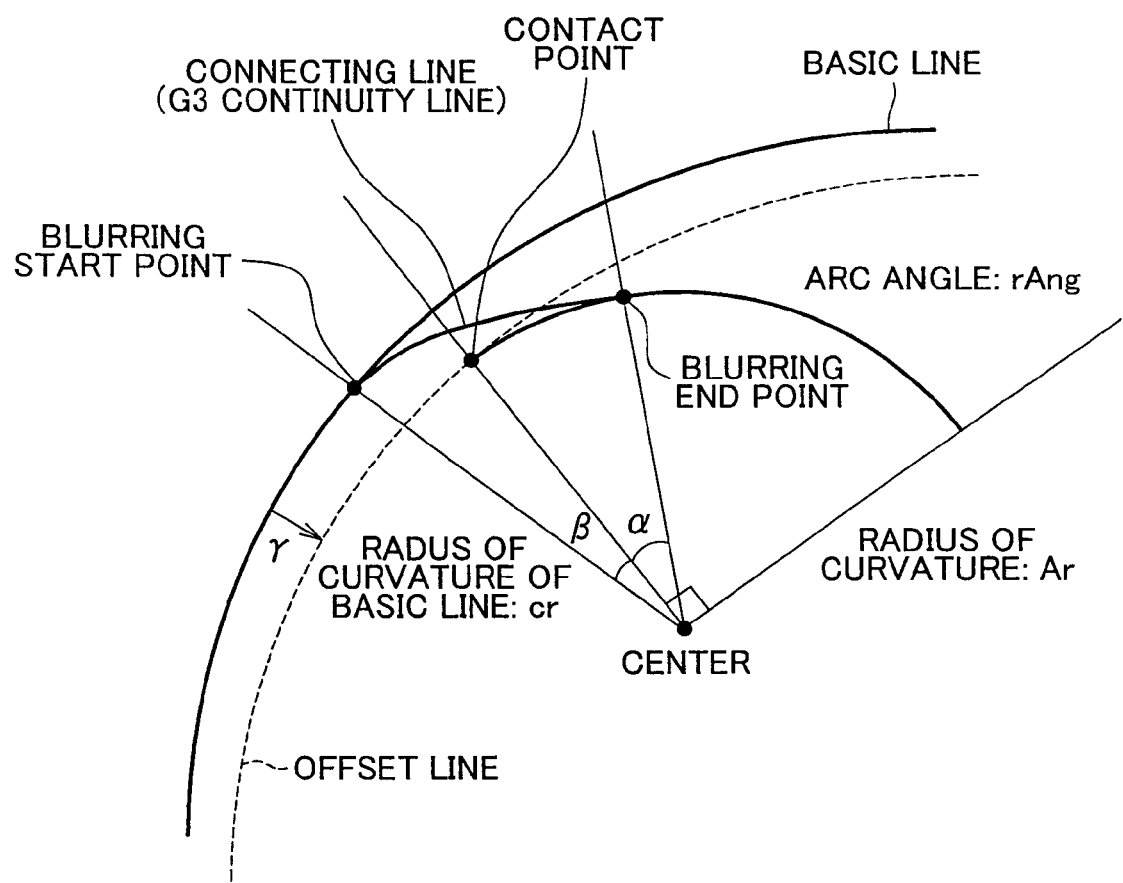
FIG. 21 is a schematic view, which is an enlarged view of a portion of FIG. 20, for explaining the design filleting process of the internal contact pattern.

In the following, the above-mentioned opening angles α, β, and offset amount γ will be described. As shown in FIG. 21, rAng denotes the angle of the arc, Ar denotes the radius of the arc, and cr denotes the radius of curvature of the basic line. Also, as preset constants, an angle reference value Ab, an angle coefficient Ae, and a movement reference value Mb are respectively set to predetermined values.

In this case, the opening angle α that is determined as the arc-side blurring start position determining angle is empirically determined, to be equal to the angle reference value Ab, as indicated in the following equation (15)

$$\alpha = Ab \qquad (15)$$

Also, the opening angle β as the basic-line-side blurring start position determining angle is expressed by the following equation (16) that is empirically determined, for example, using the angle reference value Ab, angle coefficient Ae, arc radius Ar, and the radius cr of curvature of the basic line.

$$\beta = Ab \times Ae \times \left\{ \log_{10}\left(cr \times \frac{1}{Ar}\right) + 2.0 \right\} \qquad (16)$$

Further, the offset amount γ is expressed by the following equation (17) that is empirically determined, for example, using the opening angle α determined according to the above equation (15), opening angle β determined according to the above equation (16), movement reference value Mb, arc radius Ar, arc angle rAng, and the radius cr of curvature of the basic line.

$$\gamma = Mb \times \left(\frac{1}{Ar} - \frac{1}{cr}\right) \times \{Ar \times rAng \times (\alpha + \beta)\}^2 \quad (17)$$

As is apparent from the above equation (17), the offset amount γ is determined based on the difference in the radius of curvature.

Figure 20:
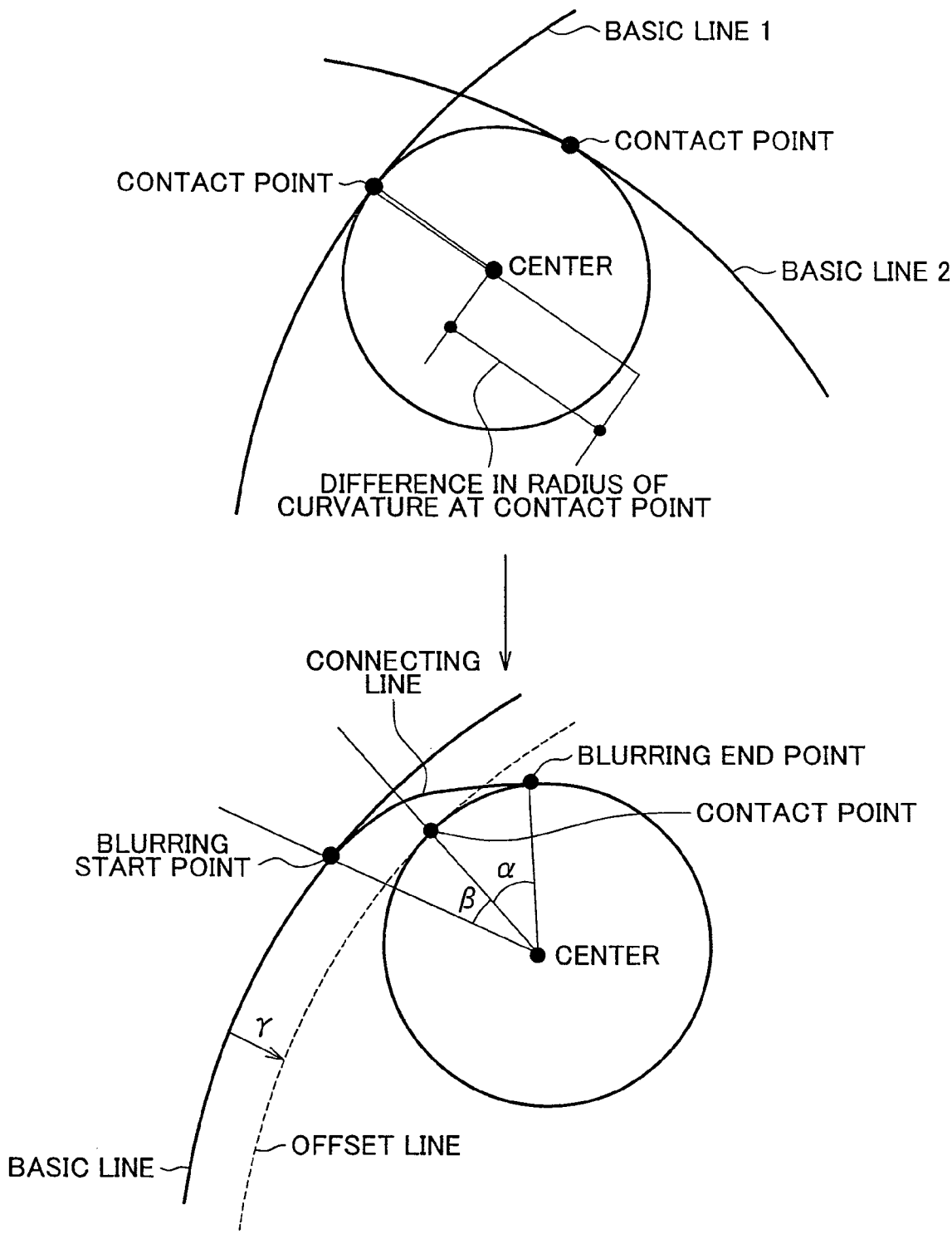
FIG. 20 is a schematic view useful for explaining a design filleting process of an internal contact pattern in the three-dimensional shape data creating method as one embodiment of the invention.

Thus, the opening angle α and the opening angle β are determined based on the above equations (15), (16), so that the blurring end point (arc-side blurring start position) on the inscribed circle (arc) and the blurring start point (basic-line-side blurring start position) on the basic line 1 can be set, as shown in FIG. 20. Also, the offset amount γ is determined based on the above equation (17), so that the basic line 1 can be offset inward in the direction of the radius of curvature by the offset amount γ, as shown in FIG. 20. Namely, the basic line and the inscribed circle (arc) has a geometric relationship that they are spaced apart from each other by the offset amount γ.

Once the blurring end point on the inscribed circle (arc) and the blurring start point on the basic line 1 are determined, a connecting line that connects these points is generated. In this case, the connecting line is generated as a curve that meets curvature differential continuity (so-called G3 continuity). When the connecting line that meets the G3 continuity is generated, it is desirable to appropriately determine the tangent lengths at the beginning point and end point of the connecting line. In this case, in order to calculate appropriate tangent lengths, the tangent length may be calculated by adjusting the distance or angle between the control points, or the tangent length that meets the G2 continuity may be used, or the tangent length may be calculated using the inner product of the control points or chord, or the tangent length may be calculated using the amount of change (fourth-order differential) of the rate of change of curvature. Then, in the final step, a fillet joint line that comprises an arc section between the two blurring end points on the inscribed circles respectively set for the basic line 1 and basic line 2, and the connecting lines generated respectively for the basic line 1 and basic line 2, is created in the design filleting process.

Next, the external contact pattern will be described. In the external contact pattern, a joint line is created by a process similar to that of the above-described internal contact pattern. Namely, in the external contact pattern, a certain circumscribing circle (arc) that circumscribes or externally contacts two basic lines, i.e., basic line 1 and basic line 2, determined (generated) as described above, is set as shown in FIG. 22. Since the design filleting process is similarly performed with respect to the basic line 1 and the basic line 2, the design filleting process performed on the basic line 1 will be explained in the following description. With the circumscribing circle thus set, a difference between the radius of curvature of the basic line 1 at a point of contact and the radius of curvature of the circumscribing circle, i.e., a difference in the radius of curvature, is calculated.

Then, the basic line 1 is offset outward in the direction of the radius of curvature, by an offset amount γ determined as described later, based on the calculated difference in the radius of curvature. Then, a certain circumscribing circle (arc) is set again, with respect to the basic line 1 (and the basic line 2) that has been offset. Subsequently, a straight line connecting the center of the set circumscribing circle (arc) and the point of contact is set, and opening angles α and β are determined as described later, with reference to the straight line. Then, a point on the circumscribing circle (arc), which corresponds to the opening angle α, is set as a blurring end point, and a point on the basic line 1, which corresponds to the opening angle β, is set as a blurring start point.

Figure 23:
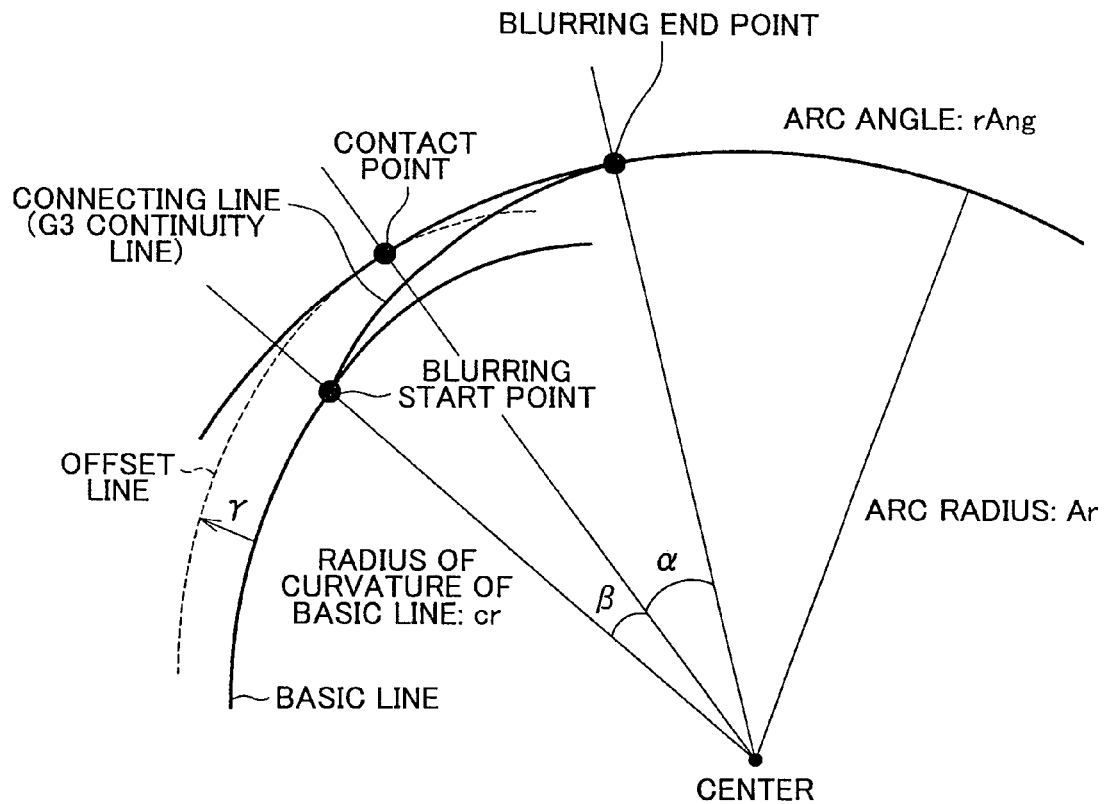
FIG. 23 is a schematic view, which is an enlarged view of a portion of FIG. 22, for explaining the design filleting process of the external contact pattern.

In the following, the above-mentioned opening angles α, β, and the offset amount γ will be described. In the external contact pattern, as shown in FIG. 23, rAng denotes the angle of the arc, Ar denotes the radius of the arc, and cr denotes the radius of curvature of the basic line, as in the internal contact pattern as described above. Also, as preset constants, an angle reference value Ab, an angle coefficient Ae and a movement reference value Mb are respectively set to predetermined values.

Then, the opening angle α determined as the arc-side blurring start position determining angle in the external contact pattern is represented by the following equation (18) that is empirically determined, for example, using the angle reference value Ab, angle coefficient Ae, arc radius Ar, and the radius of curvature cr of the basic line.

$$\alpha = Ab \times \frac{1}{Ae \times \left\{\log_{10}\left(cr \times \frac{1}{Ar}\right) + 2.0\right\}} \quad (18)$$

Also, the opening angle β as the basic-line-side blurring start position determining angle is empirically determined, to be equal to the angle reference value Ab, for example, as indicated in the following equation (19)

$$\beta = Ab \quad (19)$$

Further, the offset amount γ in the external contact pattern is represented by the following equation (20) that is empirically determined, for example, using the opening angle α determined according to the above equation (18), opening angle β determined according to the above equation (19), movement reference value Mb, arc radius Ar, arc angle rAng, and the radius of curvature cr of the basic line, as is the case with the offset amount γ in the internal contact pattern which is determined according to the above equation (17).

$$\gamma = Mb \times \left(\frac{1}{Ar} - \frac{1}{cr}\right) \times \{Ar \times rAng \times (\alpha + \beta)\}^2 \quad (20)$$

As is apparent from the above equation (20), in the external contact pattern, too, the offset amount γ is determined based on the difference in the radius of curvature.

Thus, the opening angle α and the opening angle β are determined based on the above equations (18), (19), so that the blurring end point (arc-side blurring start position) on the circumscribing circle (arc) and the blurring start point (basic-line-side blurring start position) on the basic line 1 can be set, as shown in FIG. 22. Also, the offset amount γ is determined based on the above equation (20), so that the basic line 1 can be offset outward in the direction of the radius of curvature by the offset amount γ, as shown in FIG. 22. Namely, the basic line and the circumscribing circle (arc) has a geometric relationship that they are spaced apart from each other by the offset amount γ.

Once the blurring end point on the circumscribing circle (arc) and the blurring start point on the basic line 1 are determined, a connecting line that connects these points is generated. In this case, in the external contact pattern, too, the connecting line is generated as a curve that meets curvature differential continuity (so-called G3 continuity). Then, in the final step, a fillet joint line that comprises an arc section between the two blurring end points on the circumscribed circles (arcs) respectively set for the basic line 1 and the basic line 2, and the connecting lines generated respectively for the basic line 1 and the basic line 2, is created in the design filleting process.

When the basic lines and the joint line are created as described above, an error or deviation from the original line (i.e., 3D cross-section line) is checked, as needed, and, if there is a large error, the above-described arc detection step and subsequent steps can be repeatedly carried out. In this manner, a final 3D cross-section line segment that consists of the basic lines and the joint line and appropriately reflects the sketch drawn by the designer, or the like, can be created.

If the final 3D cross-section line segments are created as described above, a 3D cross-section line segment corresponding to each character line selected as described above is determined, and a spatial curve representing the character line is created, using the thus determined 3D cross-section line segment. More specifically, the 3D cross-section line segment corresponding to the character line, when it is in the SL cross-section, is rotated, parallel-translated, or expanded or reduced in the direction of the SW cross-section, and, when it is in the SW cross-section, is rotated, parallel-translated, or expanded or reduced in the direction of the SL cross-section, so as to create a sweep surface (virtual surface), and the corresponding character line is projected onto the sweep surface in the direction of the viewpoint, so that the character line in the form of a spatial curve is created. In this case, since the generated spatial curve (i.e., character line) is preferably created as a plane curve, given three points are set on the sweep surface, and the spatial curve is preferably converted into a plane curve.

Figure 24:
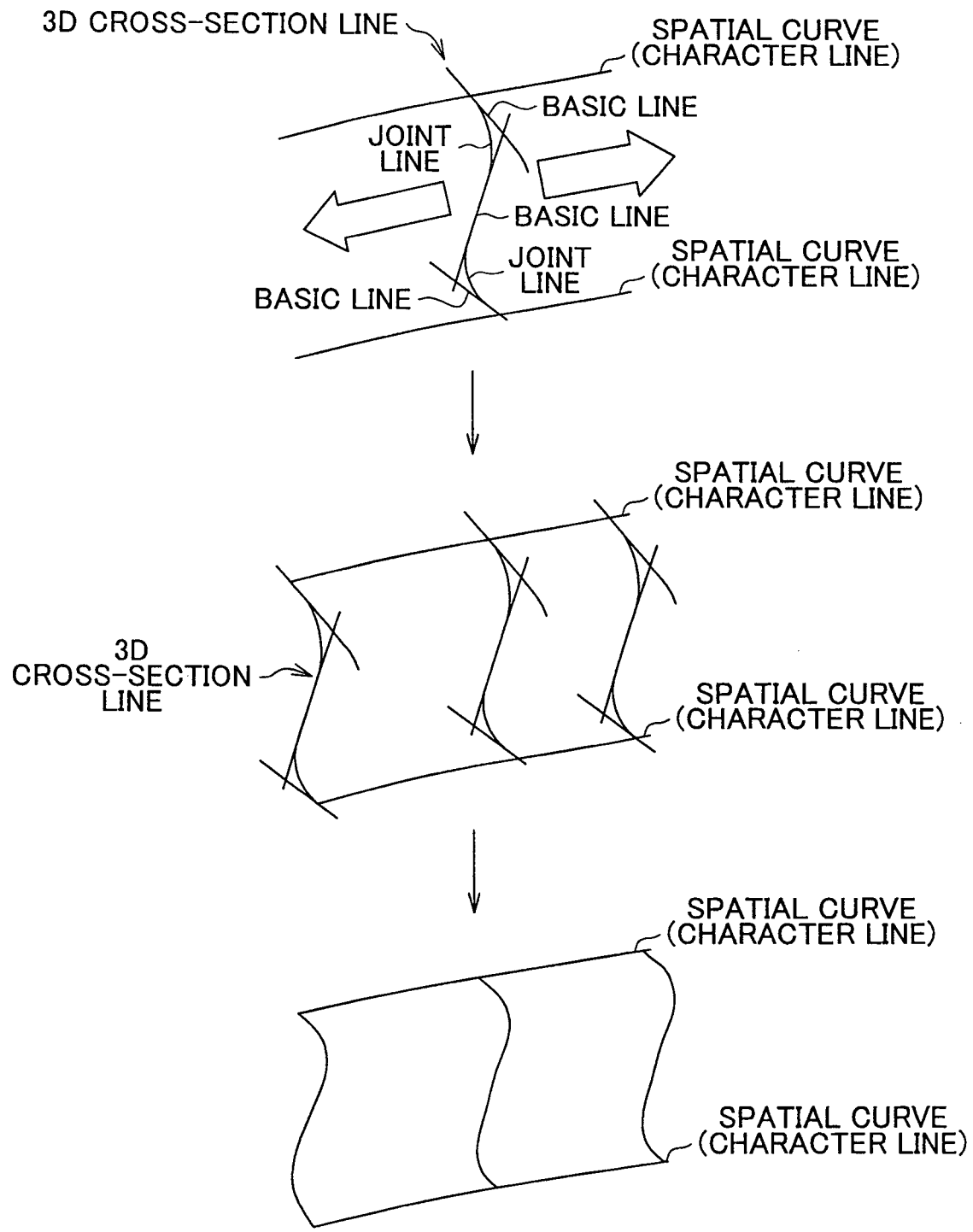
FIG. 24 is a schematic view useful for explaining batch creation of complex surfaces in the three-dimensional shape data creating method as one embodiment of the invention.

Then, once the character lines are created as spatial curves in the above manner, at least one of the spatial curves is used as a guide line, and a plurality of 3D cross-section line segments corresponding to the final 3D cross-section line segment is created at a time, in the direction of the guide line(s), as shown in FIG. 24, so as to form a complex surface of the given region. When the complex surfaces of the respective regions are created at a time, each curve data expressed in the 3D coordinate system obtained as described above is used, and the complex surfaces of the respective regions of the three-dimensional object, which satisfy preset restraint conditions (e.g., condition of continuity (G0, G1, G2, G3) for the created basic surfaces, constraint on the connection angle, constraint on the position passed, radius and continuity condition (G1, G2, G3) for fillet joint surfaces, the presence of gradual changes, etc.), can be created at a time, utilizing the known CAD function.

In the three-dimensional shape data creating method as one embodiment of the invention, the shapes of the complex surfaces of the respective regions automatically created at a time are corrected. The correction of the shape of each complex surface is an operation to correct the shape that looks good in a perspective drawing, but is distorted or looks unnatural in a three-view drawing, for example. The shapes of the complex surfaces may be corrected by, for example, correcting the shape of a 2D cross-section line or lines, or correcting components (coordinate values, tangent values, curvature components) that determine the direction of the perspective view, or correcting the inclination of a solid body in each projection without changing views in other projections, or correcting the shape utilizing the symmetry of the vehicle, or correcting the shape based on how the sketch image drawn from another viewpoint looks like. When the shapes of the complex surfaces are corrected utilizing the symmetry of the vehicle, or when the shapes of the complex surfaces are corrected based on how the sketch image drawn from another viewpoint looks like, the shapes of the created complex surfaces of the respective regions can be appropriately corrected by, for example, changing the plane round amount of the sweep surface on which the character line is projected.

Figure 25:
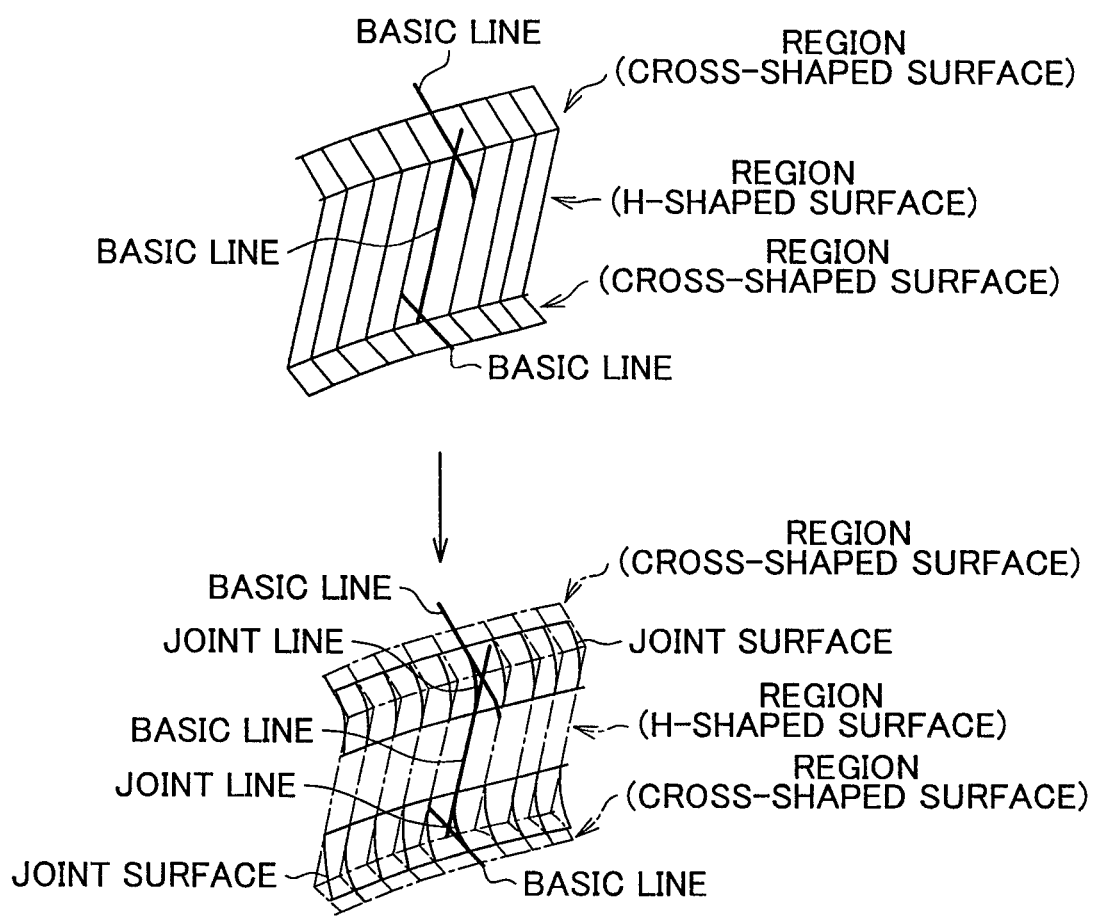
FIG. 25 is a schematic view in which adjacent regions are joined by fillet joint surfaces created by the design filleting process, in the three-dimensional shape data creating method as one embodiment of the invention.

Subsequently, given regions formed in the above-indicated step S150 of FIG. 1 are joined by created fillet joint surfaces, using the above-described design filleting process (step S160). Namely, in the joining process, a fillet joint line is generated by the above-described design filleting process, between each set of basic lines that form two adjacent complex surfaces, out of the complex surfaces of the given regions formed, and the complex surfaces are joined to each other, using fillet joint surfaces created from the fillet joint lines thus generated, as shown in FIG. 25. In this manner, the given regions can be joined to each other, while reflecting the intention or image of the designer, or the like. The complex surfaces of respective regions of the three-dimensional object can be joined to each other, through the known CAD function, using data of the fillet joint lines, while satisfying preset restraint conditions (e.g., condition of continuity (G0, G1, G2, G3) for the basic surfaces in the complex surfaces, constraint on the connection angle, constraint on the position passed, radius and continuity condition (G1, G2, G3) for the fillet joint surfaces, the presence of gradual changes, etc.).

Furthermore, in step S160, a three-view or more corner filleting process is carried out, using the known CAD function. As a result, final three-dimensional shape data of the three-dimensional object is obtained from the quarter view sketch created by the designer, or the like.

As is understood from the above description, when the viewpoint position is determined, characteristic points and characteristic axes on the three-dimensional object depicted in the sketch are associated with certain points and certain axes in the vehicle specs box (namely, a general solution for associating points with points, points with axes, and axes with axes is obtained); therefore, the optimum viewpoint position (in other words, the positional relationships in the three-dimensional space, among the three-dimensional object depicted in the sketch image, the viewpoint of the sketch image, and the vehicle specs box) can be extremely promptly determined with reliability. Also, the 3D cross-section lines in given regions of the three-dimensional object depicted in the image of the sketch are determined, based on the determined viewpoint position (positional relationships), so that complex surfaces of the given regions can be generated at a time, and the complex surfaces of adjacent ones of the given regions can be continuously and smoothly joined to each other. It is thus possible to create three-dimensional shape data for creating extremely high-quality curved surfaces having a high aesthetic quality, assuring simplified, through simplified operations of an extremely high efficiency.

Since the three-dimensional object (two-dimensional) drawn in the sketch by the designer, or the like, is appropriately reflected by the three-dimensional shape data, three-dimensional shape data exactly as intended or imaged by the designer in the sketch can be created. Accordingly, a designed solid (or three-dimensional) object can be quickly produced, using the created three-dimensional shape data as it is, as working or molding data (NC machining data), for example, whereby the product development process can be significantly shortened.

In one embodiment of three-dimensional shape data creating method of the invention, it is possible to convert an artificial two-dimensional object created by computer graphics (CG) into three-dimensional form, while maintaining the image of the two-dimensional object. Therefore, an artificial two-dimensional object can be naturally combined with a photographic background to create a composite picture.

In one embodiment of three-dimensional shape data creating method of the invention, a two-dimensional image depicted in a sketch can be extremely easily and accurately converted into three-dimensional form; therefore, animated characters, for example, can be easily converted into three-dimensional form.

In the three-dimensional shape data creating method of the illustrated embodiment, the invention is applied to a sketch drawn by a designer, or the like, and the manner of converting a two-dimensional image on the sketch into three-dimensional form has been described. However, it is possible to facilitate creation of a 2D animated character, through a process of converting an animation image (2D) into a 3D image, giving motion in a desired direction to the 3D image, and converting the 3D image into 2D form. The animated character thus created may be selected from automobiles and other vehicles or conveyances, living matters or life forms, machines, and so forth.

The three-dimensional shape data creating method according to the invention may be applied to the task of forming three-dimensional objects from sketches drawn by designers for automotive manufactures, consumer electronics manufactures, and other manufactures, the task of forming three-dimensional objects from sketches in commercial film production, TV production, and film production industries, and the task of forming three-dimensional objects from sketches in an animation production industry, for example.

The invention claimed is:

1. A three-dimensional shape data creating method for creating three-dimensional shape data of a three-dimensional object depicted in a sketch image, the method comprising:
    entering specifications of the three-dimensional object depicted in the sketch image, the specifications including dimensions of respective portions of the three-dimensional object and placement positions of parts that constitute the three-dimensional object, the dimensions and the placement positions being specifications necessary to create a specs box used for defining given axes and given points on the three-dimensional object in a three-dimensional space;
    reading the sketch image as image data;
    generating data representing lines included in the read image data, using coordinate values on a two-dimensional coordinate system;
    selecting a characteristic axis and a characteristic point which characterize the shape of the three-dimensional object depicted in the sketch image;
    calculating a combination that satisfies a predetermined restraint condition, the combination being selected from combinations obtained by associating the selected characteristic axis and the selected characteristic point with a given axis and a given point among the given axes and given points on the specs box created from the specifications;
    determining positional relationships in the three-dimensional space, among the three-dimensional object depicted in the sketch image, a viewpoint from which the sketch image is viewed, and the specs box, using the calculated combination;
    creating second a cross-section lines in the three-dimensional space by mapping first a cross-section lines in a first given region and a second given region of the three-dimensional object depicted in the sketch image, in the three-dimensional space, based on the determined positional relationships;
    creating a first basic line and a second basic line from each of the second cross-section lines;
    creating third cross-section lines each constituted by joining the first basic line and the second basic line with a fillet joint line, the respective third cross-section lines corresponding to the first given region and the second given region;
    creating a first specified line and a second specified line as a first spatial curve and a second spatial curve in the three-dimensional space, using the third cross-section lines, the first specified line representing the first given region, and the second specified line representing the second given region;
    creating a first complex surface of the first given region by creating, along the first spatial curve, cross-section lines corresponding to a corresponding one of the third cross-section lines;
    creating a second complex surface of the second given region by creating, along the second spatial curve, cross-section lines corresponding to a corresponding one of the third cross-section lines, the second complex surface being adjacent to the first complex surface; and
    creating a fillet joint surface between the first complex surface and the second complex surface, and continuously joining the first complex surface and the second complex surface.

2. The three-dimensional shape data creating method according to claim 1, wherein each of the first specified line and the second specified line is a character line selected from contours of the three-dimensional object.

3. The three-dimensional shape data creating method according to claim 1, wherein the positional relationships in the three-dimensional space, among the three-dimensional object depicted in the sketch image, the viewpoint of the sketch image, and the specs box, which relationships are determined using the combination that satisfies the predetermined restraint condition, are listed in increasing order of errors, and are presented to a user.

4. The three-dimensional shape data creating method according to claim 1, wherein:
    the first basic line and the second basic line are generated which each exclude an arc portion from the second cross-section lines; and
    the generated first and second basic lines are joined to the fillet joint line comprising an arc and a connecting line having varying curvatures, which have a certain geometrical relationship with the first and second basic lines.

5. The three-dimensional shape data creating method according to claim 4, further comprising:
    correcting the shape of the first complex surface by remedying distortion of the first spatial curve;
    correcting the shape of the first spatial curve based on at least one of a symmetry of the three-dimensional object depicted in the sketch image, and the three-dimensional object depicted in the sketch image as viewed from a second viewpoint;
    correcting the shape of the second complex surface by remedying distortion of the second spatial curve; and
    correcting the shape of the second spatial curve based on at least one of the symmetry of the three-dimensional object depicted in the sketch image, and the three-dimensional object depicted in the sketch image as viewed from a third viewpoint.

6. The three-dimensional shape data creating method according to claim 1, wherein the fillet joint surface is created by using the fillet joint line comprising an arc and a connecting line having varying curvatures, which have a certain geometric relationship with the first and second basic lines.

7. A three-dimensional shape data creating method for creating three-dimensional shape data of a three-dimensional object depicted in a sketch image, the method comprising:
   entering specifications of the three-dimensional object depicted in the sketch image, the specifications including dimensions of respective portions of the three-dimensional object and placement positions of parts that constitute the three-dimensional object, the dimensions and the placement positions being specifications necessary to create a specs box used for defining given axes and given points on the three-dimensional object in a three-dimensional space;
   reading the sketch image as image data;
   generating data representing lines included in the read image data, using coordinate values on a two-dimensional coordinate system;
   selecting a characteristic axis and a characteristic point which characterize the shape of the three-dimensional object depicted in the sketch image;
   calculating a combination that satisfies a predetermined restraint condition, the combination being selected from combinations obtained by associating the selected characteristic axis and the selected characteristic point with a given axis and a given point among the given axes and given points on the specs box created from the specifications;
   determining positional relationships in the three-dimensional space, among the three-dimensional object depicted in the sketch image, a viewpoint from which the sketch image is viewed, and the specs box, using the calculated combination;
   creating a cross-section line in the three-dimensional space by mapping a cross-section line in a given region of the three-dimensional object depicted in the sketch image, in the three-dimensional space, based on the determined positional relationships, creating a specified line in the given region included in the sketch image and formed into data, as a spatial curve in the three-dimensional space, using the cross-section line in the three-dimensional space, and creating a complex surface of the given region in the three-dimensional space; and
   creating a fillet joint surface between the created complex surface of the given region, and a created complex surface of another given region, and continuously joining the created complex surface of the given region and the created complex surface of said another given region, wherein
   coordinates of the characteristic point are represented by the following equation (1) in a three-dimensional coordinate system:

$$\begin{pmatrix} u_1 \\ u_2 \end{pmatrix} = F \frac{\sum_j \begin{pmatrix} a_{1j} \\ a_{2j} \end{pmatrix}(X_j - E_j)}{\sum_j a_{3j}(X_j - E_j)} \quad (1)$$

where,
$u_1$ and $u_2$ denote the coordinates of the characteristic point,
$X_1$, $X_2$, and $X_3$ denote three axes in the three-dimensional coordinate system, the three axes being perpendicular to each other, $E_1$, $E_2$, and $E_3$ denote coordinates of the viewpoint in the three-dimensional coordinate system,
$a_1$ denotes a first axis extending from the viewpoint,
$a_2$ denotes a second axis that extends from the viewpoint and that is perpendicular to the first axis,
$a_3$ denotes an outer vector product of $a_1$ and $a_2$,
F denotes a distance from the viewpoint to the coordinates of the characteristic point, and
$E_1$, $E_2$, $E_3$, $\theta$, $\phi$, $\psi$, and F are determined such that a value of a function $G_1$ as represented by the following equation (2) is minimized:

$$G_1(\theta, \phi, \psi, E_1, E_2, E_3, F) = \sum^n w_{pp\_n} f_{pp\_n} + \sum^n w_{aa\_n} f_{aa\_n} + \sum^n w_{ap\_n} f_{ap\_n} \quad (2)$$

where,
$\theta$, $\phi$, and $\psi$ respectively denote Euler angles of $a_1$, $a_2$, and $a_3$,
$f_{pp\_n}$ denotes an error between the characteristic point and the given point,
$f_{aa\_n}$ denotes an error between the characteristic axis and the given axis,
$f_{ap\_n}$ denotes an error between the characteristic point and the given axis, and
$w_{pp\_n}$, $w_{aa\_n}$, and $w_{ap\_n}$ denote respective weighting factors associated with $f_{pp\_n}$, $f_{aa\_n}$, and $f_{ap\_n}$.

8. The three-dimensional shape data creating method according to claim 7, wherein
   the predetermined restraint condition includes a first restraint condition, a second restraint condition, a third restraint condition, and a fourth restraint condition,
   the first restraint condition is a restraint condition that the characteristic point coincides with the given point,
   the second restraint condition is a restraint condition that a distance between the characteristic point and the given point is equal to 0,
   the third restraint condition is a restraint condition that a plane formed by the characteristic axis and the viewpoint and the given axis are parallel with each other, and
   the fourth restraint condition is a restraint condition that, when the characteristic point is projected on a virtual two-dimensional screen by connecting the characteristic point and the viewpoint to each other and when the given axis is projected on the virtual two-dimensional screen by connecting the given axis and the viewpoint to each other, a distance between the projected characteristic point and the projected given axis is minimized.

9. A nontransitory computer-readable storage medium that stores computer-executable instructions for performing the three-dimensional shape data creating method according to claim 1.

10. A three-dimensional shape data creating apparatus that creates three-dimensional shape data of a three-dimensional object depicted in a sketch image, the apparatus comprising:
    circuitry configured to:
    receive specifications of the three-dimensional object drawn by a user in the sketch image, the specifications including dimensions of respective portions of the three-dimensional object and placement positions of parts that constitute the three-dimensional object, the dimensions and the placement positions being specifications necessary to create a specs box used for defining given axes and given points on the three-dimensional object in a three-dimensional space;

read the sketch image as image data;
generate data representing lines included in the read image data, using coordinate values on a two-dimensional coordinate system;
select a characteristic axis and a characteristic point which characterize the shape of the three-dimensional object depicted in the sketch image;
calculate a combination that satisfies a predetermined restraint condition, the combination being selected from combinations obtained by associating the selected characteristic axis and the selected characteristic point with a given axis and a given point among the given axes and given points on the specs box created from the input specifications,
determine positional relationships in the three-dimensional space, among the three-dimensional object depicted in the sketch image, a viewpoint from which the sketch image is viewed, and the specs box, using the calculated combination;
create second cross-section lines in the three-dimensional space by mapping first cross-section lines in a first given region and a second given region of the three-dimensional object depicted in the sketch image, in the three-dimensional space, based on the determined positional relationships;
create a first basic line and a second basic line from each of the second cross-section lines;
create third cross-section lines each constituted by joining the first basic line and the second basic line with a fillet joint line, the respective third cross-section lines corresponding to the first given region and the second given region;
create a first specified line and a second specified line as a first spatial curve and a second spatial curve in the three-dimensional space, using the third cross-section lines, the first specified line representing the first given region, and the second specified line representing the second given region;
create a first complex surface of the first given region by creating, along the first spatial curve, cross-section lines corresponding to a corresponding one of the third cross-section lines;
create a second complex surface of the second given region by creating, along the second spatial curve, cross-section lines corresponding to a corresponding one of the third cross-section lines, the second complex surface being adjacent to the first complex surface; and
create a fillet joint surface between the first complex surface and the second complex surface, and continuously joining the first complex surface and the second complex surface.

11. The three-dimensional shape data creating apparatus according to claim 10, wherein each of the first specified line and the second specified line is a character line selected from contours of the three-dimensional object.

12. The three-dimensional shape data creating apparatus according to claim 10, wherein the circuitry is configured to list, in increasing order of errors, the positional relationships in the three-dimensional space, among the three-dimensional object depicted in the sketch image, the viewpoint of the sketch image, and the specs box, which relationships are determined using the combination that satisfies the predetermined restraint condition, and present the positional relationships to the user.

13. The three-dimensional shape data creating apparatus according to claim 10, wherein the circuitry is configured to:
generate the first basic line and the second basic line that each exclude an arc portion from the second cross-section lines; and
join the generated first and second basic lines to the fillet joint line comprising an arc and a connecting line having varying curvatures, which have a certain geometrical relationship with the first and second basic lines.

14. The three-dimensional shape data creating apparatus according to claim 13, wherein the circuitry is configured to:
correct the shape of the first complex surface by remedying distortion of the first spatial curve;
correct the shape of the first spatial curve based on at least one of a symmetry of the three-dimensional object depicted in the sketch image, and the three-dimensional object depicted in the sketch image as viewed from a second viewpoint;
correct the shape of the second complex surface by remedying distortion of the second spatial curve; and
correct the shape of the second spatial curve based on at least one of the symmetry of the three-dimensional object depicted in the sketch image, and the three-dimensional object depicted in the sketch image as viewed from a third viewpoint.

15. The three-dimensional shape data creating apparatus according to claim 10, wherein the circuitry is configured to create the fillet joint surface, using the fillet joint line comprising an arc and a connecting line having varying curvatures, which have a certain geometric relationship with the first and second basic lines.

16. A three-dimensional shape data creating apparatus that creates three-dimensional shape data of a three-dimensional object depicted in a sketch image, the apparatus comprising:
circuitry configured to:
receive specifications of the three-dimensional object drawn by a user in the sketch image, the specifications including dimensions of respective portions of the three-dimensional object and placement positions of parts that constitute the three-dimensional object, the dimensions and the placement positions being specifications necessary to create a specs box used for defining given axes and given points on the three-dimensional object in a three-dimensional space;
read the sketch image as image data;
generate data representing lines included in the read image data, using coordinate values on a two-dimensional coordinate system;
select a characteristic axis and a characteristic point which characterize the shape of the three-dimensional object depicted in the sketch image;
calculate a combination that satisfies a predetermined restraint condition, the combination being selected from combinations obtained by associating the selected characteristic axis and the selected characteristic point with a given axis and a given point among the given axes and given points on the specs box created from the input specifications,
determine positional relationships in the three-dimensional space, among the three-dimensional object depicted in the sketch image, a viewpoint from which the sketch image is viewed, and the specs box, using the calculated combination;
create a cross-section line in the three-dimensional space by mapping a cross-section line in a given region of the three-dimensional object depicted in the sketch image, in the three-dimensional space, based on the determined positional relationships, create a specified line in the given region included in the sketch image and formed into data, as a spatial curve in the three-dimensional space, using the cross-section line in the three-dimensional space, and create a complex surface of the given region in the three-dimensional space; and create a fillet joint surface between the created complex surface of the given region, and a created complex surface of another given region, and continuously joining the created complex surface of the given region and the created complex surface of said another given region, wherein coordinates of the characteristic point are represented by the following equation (1) in a three-dimensional coordinate system:

$$\begin{pmatrix} u_1 \\ u_2 \end{pmatrix} = F \frac{\sum_j \begin{pmatrix} a_{1j} \\ a_{2j} \end{pmatrix}(X_j - E_j)}{\sum_j a_{3j}(X_j - E_j)} \quad (1)$$

where, $u_1$ and $u_2$ denote the coordinates of the characteristic point, $X_1$, $X_2$, and $X_3$ denote three axes in the three-dimensional coordinate system, the three axes being perpendicular to each other, $E_1$, $E_2$ and $E_3$ denote coordinates of the viewpoint in the three-dimensional coordinate system, $a_1$ denotes a first axis extending from the viewpoint, $a_2$ denotes a second axis that extends from the viewpoint and that is perpendicular to the first axis, $a_3$ denotes an outer vector product of $a_1$ and $a_2$, F denotes a distance from the viewpoint to the coordinates of the characteristic point, and $E_1$, $E_2$, $E_3$, $\theta$, $\phi$, $\psi$, and F are determined such that a value of a function $G_1$ as represented by the following equation (2) is minimized:

$$G_1(\theta, \phi, \psi, E_1, E_2, E_3, F) = \quad (2)$$

$$\sum_{}^{n} w_{pp\_n} f_{pp\_n} + \sum_{}^{n} w_{aa\_n} f_{aa\_n} + \sum_{}^{n} w_{ap\_n} f_{ap\_n}$$

where, $\theta$, $\phi$, and $\psi$ respectively denote Euler angles of $a_1$, $a_2$, and $a_3$, $f_{pp\_n}$ denotes an error between the characteristic point and the given point, $f_{aa\_n}$ denotes an error between the characteristic axis and the given axis, $f_{ap\_n}$ denotes an error between the characteristic point and the given axis, and $w_{pp\_n}$, $w_{aa\_n}$, and $w_{ap\_n}$ denote respective weighting factors associated with $f_{pp\_n}$, $f_{aa\_n}$, and $f_{ap\_n}$.

17. The three-dimensional shape data creating apparatus according to claim 16, wherein the predetermined restraint condition includes a first restraint condition, a second restraint condition, a third restraint condition, and a fourth restraint condition, the first restraint condition is a restraint condition that the characteristic point coincides with the given point, the second restraint condition is a restraint condition that a distance between the characteristic point and the given point is equal to 0, the third restraint condition is a restraint condition that a plane formed by the characteristic axis and the viewpoint and the given axis are parallel with each other, and the fourth restraint condition is a restraint condition that, when the characteristic point is projected on a virtual two-dimensional screen by connecting the characteristic point and the viewpoint to each other and when the given axis is projected on the virtual two-dimensional screen by connecting the given axis and the viewpoint to each other, a distance between the projected characteristic point and the projected given axis is minimized.

* * * * *